(12) United States Patent
Kim et al.

(10) Patent No.: US 9,391,671 B2
(45) Date of Patent: Jul. 12, 2016

(54) WIRELESS POWER TRANSMISSION AND CHARGING SYSTEM AND METHOD THEREOF

(75) Inventors: Nam Yun Kim, Seoul (KR); Chang Ho Lee, Suwon-si (KR); Sang Wook Kwon, Seongnam-si (KR); Yun Kwon Park, Dongducheon-si (KR); Young Tack Hong, Seongnam-si (KR)

(73) Assignees: Samsung Electronics Co., Ltd., Suwon-si (KR); LCLINK Co., Ltd., Seoul (KR)

( * ) Notice: Subject to any disclaimer, the term of this patent is extended or adjusted under 35 U.S.C. 154(b) by 112 days.

(21) Appl. No.: 13/457,597

(22) Filed: Apr. 27, 2012

(65) Prior Publication Data

US 2012/0281547 A1    Nov. 8, 2012

(30) Foreign Application Priority Data

May 6, 2011    (KR) ........................ 10-2011-0042898

(51) Int. Cl.
*H02J 7/00*    (2006.01)
*H04B 5/00*    (2006.01)
*B60L 11/18*    (2006.01)
*H02J 5/00*    (2016.01)
*H02J 7/02*    (2016.01)

(52) U.S. Cl.
CPC ............ *H04B 5/0031* (2013.01); *B60L 11/182* (2013.01); *B60L 11/1833* (2013.01); *H04B 5/0037* (2013.01); *H04B 5/0093* (2013.01); *B60L 2210/10* (2013.01); *B60L 2210/30* (2013.01); *B60L 2210/40* (2013.01); *H02J 5/005* (2013.01); *H02J 7/025* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(58) Field of Classification Search
CPC ............................. H04W 40/02; H04W 40/10
USPC ......... 370/242–245, 311, 375, 338, 349, 352; 320/108; 455/226.3, 343.1
See application file for complete search history.

(56) References Cited

U.S. PATENT DOCUMENTS

| | | | | |
|---|---|---|---|---|
| 6,463,307 | B1 * | 10/2002 | Larsson et al. ................ | 455/574 |
| 6,956,870 | B1 * | 10/2005 | Charriere et al. ............. | 370/470 |
| 8,041,972 | B2 * | 10/2011 | Jarosinski et al. ............ | 713/323 |
| 2002/0141447 | A1 * | 10/2002 | Leung et al. .................. | 370/469 |

(Continued)

FOREIGN PATENT DOCUMENTS

| | | |
|---|---|---|
| JP | 2009-303294 | 12/2009 |
| JP | 2010-011588 | 1/2010 |

(Continued)

*Primary Examiner* — Dang Ton
*Assistant Examiner* — Sai Aung
(74) *Attorney, Agent, or Firm* — NSIP Law

(57) ABSTRACT

A wireless power transmission and charging system is provided. The wireless power transmission and charging system may include a source device to wirelessly transmit a power, and a target device to wirelessly receive the power. A communication error may be reduced, and a power transmission efficiency may be increased, by performing communication between the source device and the target device using a shortened packet generated by converting, for example, a packet of a byte scale to a packet of a bit scale.

25 Claims, 19 Drawing Sheets

(56) References Cited

U.S. PATENT DOCUMENTS

| | | | |
|---|---|---|---|
| 2004/0151147 A1* | 8/2004 | Huckins | 370/338 |
| 2008/0137615 A1* | 6/2008 | Park et al. | 370/332 |
| 2009/0140690 A1* | 6/2009 | Jung | 320/108 |
| 2009/0232243 A1* | 9/2009 | Tsuboi et al. | 375/267 |
| 2009/0264964 A1* | 10/2009 | Abrahamson | 607/60 |
| 2009/0327826 A1* | 12/2009 | Inoue et al. | 714/748 |
| 2010/0007307 A1* | 1/2010 | Baarman et al. | 320/108 |
| 2010/0151808 A1* | 6/2010 | Toncich et al. | 455/226.3 |
| 2011/0062916 A1* | 3/2011 | Farahani | 320/108 |
| 2011/0184888 A1* | 7/2011 | Lee et al. | 705/412 |
| 2011/0221389 A1* | 9/2011 | Won et al. | 320/108 |
| 2011/0221391 A1* | 9/2011 | Won et al. | 320/108 |
| 2011/0225073 A1* | 9/2011 | Won et al. | 705/30 |
| 2011/0248570 A1* | 10/2011 | Hong et al. | 307/104 |
| 2011/0279244 A1* | 11/2011 | Park et al. | 340/10.34 |
| 2012/0178383 A1* | 7/2012 | Dottling et al. | 455/73 |
| 2012/0274154 A1* | 11/2012 | DeLuca | 307/149 |

FOREIGN PATENT DOCUMENTS

| | | |
|---|---|---|
| JP | 2010-028934 | 2/2010 |
| JP | 2010-028936 | 2/2010 |
| JP | 2010-028938 | 2/2010 |
| JP | 2010-045960 | 2/2010 |
| JP | 2010-148174 | 7/2010 |
| JP | 2011-030404 | 2/2011 |
| KR | 10-2011-0009228 | 1/2011 |

* cited by examiner

FIG. 7A

| Code | Command |
|---|---|
| 0001 | Reset |
| 0010 | Target input voltage and current request<br>Target input voltage and current response |
| 0011 | Target DC/DC output voltage and current request<br>Target DC/DC output voltage and current response |
| 0100 | ACK(Acknowledge) |
| 0101 | Power ON request |
| 0110 | Power OFF request |
| 0111 | Target state information request<br>Target state information response |
| 1000 | Access standard |
| 1001 | NACK |
| 1010 | Target ID for charging request<br>Target ID for charging response |
| 1110 | Target device registration information request<br>Target device registration information response |
| 1111 | Conversion from shortened packet to general packet request |
|  | Target resonator ON/OFF request |

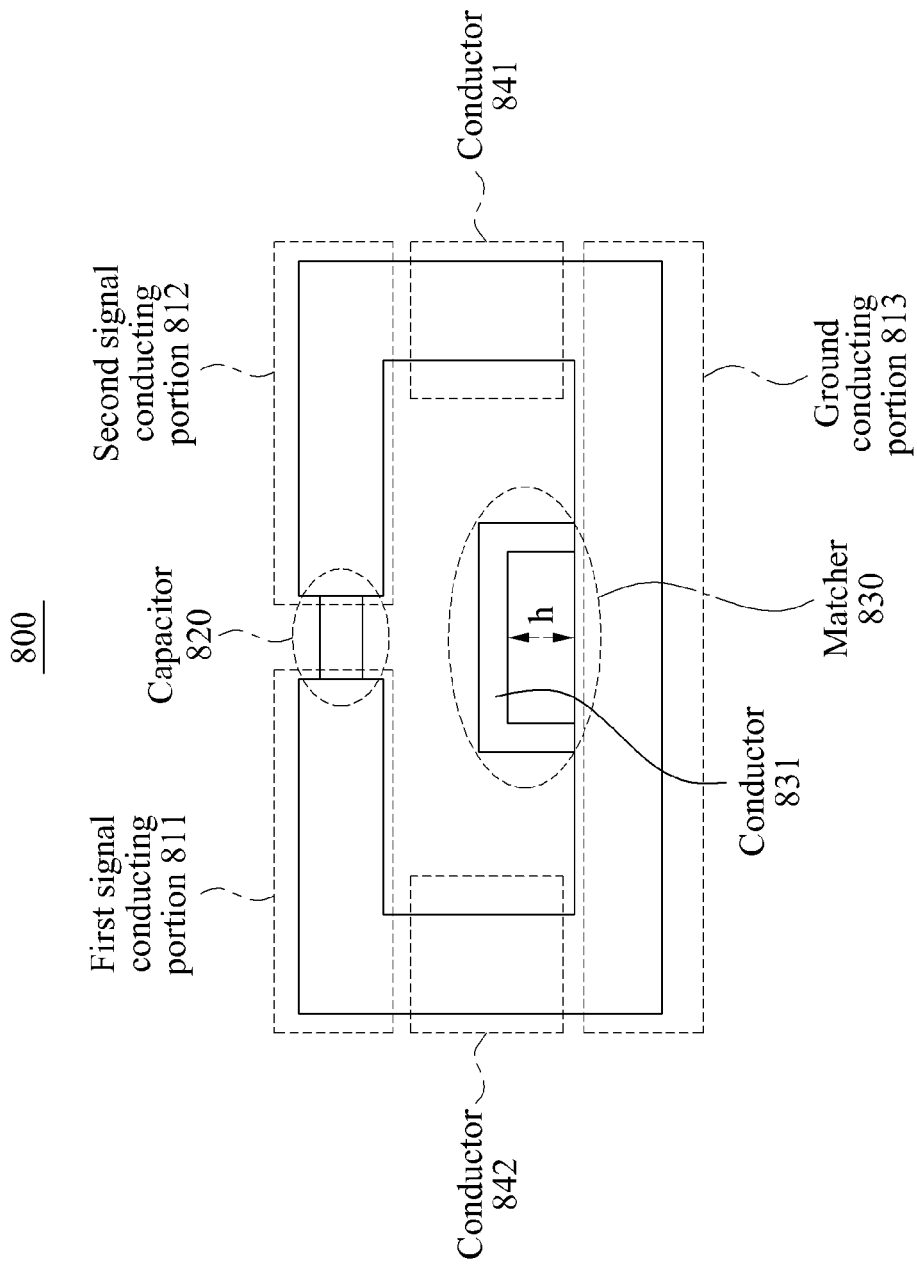

WIRELESS POWER TRANSMISSION AND CHARGING SYSTEM AND METHOD THEREOF

CROSS-REFERENCE TO RELATED APPLICATION(S)

This application claims the benefit under 35 U.S.C. §119(a) of Korean Patent Application No. 10-2011-0042898, filed on May 6, 2011, in the Korean Intellectual Property Office, the entire disclosure of which is incorporated herein by reference for all purposes.

BACKGROUND

1. Field

The following description relates to a wireless power transmission and charging system and method.

2. Description of Related Art

Wireless power transfer refers to energy that is transferred from a wireless power transmitter to a wireless power receiver, for example, using magnetic coupling. The wireless power receiver may charge a battery using the received energy. Typically, a wireless power transmission and charging system includes a source device to wirelessly transmit power and a target device to wirelessly receive the power. In this example, the source device is referred to as a wireless power transmitter and the target device is referred to as a wireless power receiver.

Typically the source device includes a source resonator, and the target device includes a target resonator. Magnetic coupling or resonance coupling may be formed between the source resonator and the target resonator thus allowing for the transfer of power.

SUMMARY

In one general aspect, there is provided a communication method of a wireless power transmission and charging system, the communication method including transmitting a wake-up request message to a target device through an in-band communication scheme or an out-band communication scheme in which data is transmitted and received using a resonance frequency, and receiving, from the target device, an acknowledgement (ACK) message in response to the wake-up request message, wherein at least one of the wake-up request message and the ACK message corresponds to a shortened packet that is generated by converting a packet of a byte scale into a packet of a bit scale.

The communication method may further comprise generating power to be used by the target device for communication by converting a direct current (DC) voltage to an alternating current (AC) voltage using the resonance frequency, and transmitting the power to the target device through magnetic coupling.

The shortened packet may comprise a field to indicate a start of a packet, a field to indicate an identifier of the target device, a field to indicate a command to be transferred to the target device, and a field to check an error of the shortened packet.

The shortened packet may comprise a field to be added in order to prevent packet loss in a wireless environment, a field to indicate a start of a packet, a field to indicate a command to be transferred to a source device, a field to indicate data associated with the command, and a field to check an error of the shortened packet.

The ACK message may comprise at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

The communication method may further comprise assigning, to the target device, a virtual identifier to be used during charging.

The communication method may further comprise transmitting, to the target device, a request message or an information message to direct a predetermined operation.

The request message or the information message may comprise at least one of a reset command to request a reset of the target device, in response to an error occurring in an operation of the target device, a command to request an input voltage value and an input current value of a target device, a command to request a direct current to direct current (DC/DC) output voltage value and a DC/DC output current value of the target device, a command to direct a power supply to a load, a command to request suspension of the power supply to the load, a command to request state information about the target device, a command to transfer communication regulations, a command to request registration information about the target device, a command to control the target resonator to be powered ON and OFF, and a command to request a change of a message format.

In another aspect, there is provided a communication method of a wireless power transmission and charging system, the communication method including transmitting a request message or an information message to a target device, through an in-band communication scheme in which data is transmitted and received using a resonance frequency or an out-band communication scheme, and receiving, from the target device, a response message corresponding to the request message or the information message, wherein at least one of the request message or the information message comprises a field to indicate a start of the request message or the information message, a field to indicate an identifier of the target device, a field to indicate a command to be transferred to the target device, and a check field to check an error of the request message or the information message, and each of the fields is of a bit scale.

The communication method may further comprise generating power to be used by the target device for communication, by converting a direct current (DC) voltage to an alternating current (AC) voltage using the resonance frequency, and transmitting the power to the target device through magnetic coupling.

The field to indicate the command may comprise at least one of a reset command to request a reset of the target device, in response to an error occurring in an operation of the target device, a command to request an input voltage value and an input current value of a target device, a command to request a DC/DC output voltage value and a DC/DC output current value of the target device, a command to direct a power supply to a load, a command to request suspension of the power supply to the load, a command to request state information about the target device, a command to transfer communication regulations, a command to request registration information about the target device, a command to control the target resonator to be powered ON and OFF, and a command to request a change of a message format.

In another aspect, there is provided a communication method of a wireless power transmission and charging system, the communication method including receiving a wake-up request message from a source device, and transmitting, to the source device, an acknowledgement (ACK) message in response to the wake-up request message, using a shortened packet generated by converting a packet of a byte scale to a packet of a bit scale.

The communication method may further comprise receiving, through magnetic coupling with the source device, power that is to be used for communication.

The ACK message may comprise at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

The communication method may further comprise receiving, from the source device, a request message or an information message including a predetermined command, performing an operation in accordance with the predetermined command, and transmitting, to the source device, a response message corresponding to the request message or the information message.

The response message may comprise a field to be added in order to prevent packet loss in a wireless environment, a field to indicate a start of a packet, a field to indicate a command to be transferred to a source device, a field to indicate data associated with the command, and a field to check an error of the shortened packet.

The field to indicate the command may comprise at least one of a command to indicate a response message in response to a request for an input voltage value and an input current value of a target device, a command to indicate a response to a request for a DC-to-DC (DC/DC) output voltage value and a DC/DC output current value of the target device, a command to indicate a response to a request for state information about the target device, and a command to indicate a response to a request for registration information about the target device.

The field to indicate the data associated with the command may comprise at least one of an input voltage value and an input current value of a target device, a DC/DC output voltage value and a DC/DC output current value of the target device, state information about the target device, and registration information about the target device.

The registration information about the target device may comprise at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

In another aspect, there is provided a wireless power transmitter including a communication unit configured to transmit a wake-up request message to the target device through an in-band communication scheme in which data is transmitted and received using the resonance frequency or an out-band communication scheme, and a receiver configured to receive, from the target device, an acknowledgement (ACK) message in response to the wake-up request message, wherein at least one of the wake-up request message and the ACK message corresponds to a shortened packet generated by converting a packet of a byte scale to a packet of a bit scale.

The wireless power transmitter may further comprise a power converting unit configured to generate power to be used by the target device for communication by converting a direct current (DC) voltage to an alternating current (AC) voltage using the resonance frequency, and a source resonator configured to transmit the power to the target device through magnetic coupling.

In another aspect, there is provided a wireless power transmitter including a control and communication unit configured to transmit a request message or an information message to the target device through an in-band communication scheme in which data is transmitted and received using a resonance frequency or an out-band communication scheme, wherein the request message or the information message comprises a field to indicate a start of the request message or the information message, a field to indicate an identifier of the target is device, a field to indicate a command to be transferred to the target device, and a check field to check an error of the request message or the information message, and each of the fields is of a bit scale.

The wireless power transmitter may further comprise a power converting unit configured to generate power to be used by the target device for communication, by converting a direct current (DC) voltage to an alternating current (AC) voltage using the resonance frequency, and a source resonator configured to transmit the power to the target device through magnetic coupling.

In another aspect, there is provided a wireless power receiver including a control and communication unit configured to demodulate a message received from the source device, and to transmit, to the source device, a response message corresponding to the message received from the source device, wherein the response message comprises a shortened packet generated by converting a packet of a byte scale to a packet of a bit scale.

The wireless power receiver may further comprise a target resonator configured to receive, through magnetic coupling with the source device, power that is to be used for communication.

Other features and aspects will be apparent from the following detailed description, the drawings, and the claims.

BRIEF DESCRIPTION OF THE DRAWINGS

FIG. 7A is a diagram illustrating an example of types of commands.

FIGS. 8 through 14 are diagrams illustrating examples of various resonators.

Figure 1:
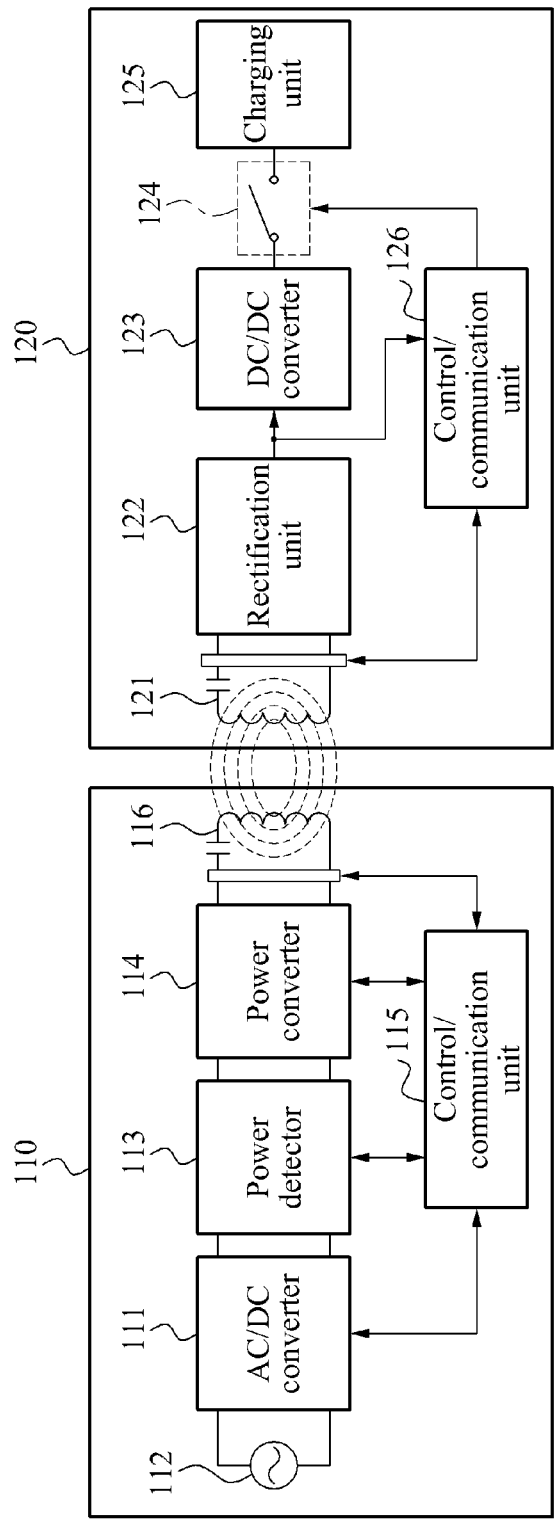
FIG. 1 is a diagram illustrating an example of a wireless power transmission and charging system.

Throughout the drawings and the detailed description, unless otherwise described, the same drawing reference numerals should be understood to refer to the same elements, features, and structures. The relative sizes and depictions of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various examples herein are directed towards wireless power transmission and reception. The source and target devices described herein may be or may be included in a terminal. For example, the terminal may include a mobile phone, a computer, a tablet, an appliance, and the like. As an example, the target device may be a terminal and the source device a charging station that may be used to wireless supply power to the terminal.

FIG. 1 illustrates an example of a wireless power transmission and charging system.

Referring to FIG. 1, the wireless power transmission and charging system includes a source device 110 and a target device 120.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a charging unit 125, and a control/communication unit 126.

The AC/DC converter 111 may generate a DC voltage by rectifying an AC voltage, for example, in a band of tens of hertz (Hz) output from a power supply 112. The AC/DC converter 111 may output a DC voltage, for example, of a predetermined level. The AC/DC converter 111 may adjust an output level of a DC voltage based on the control of the control/communication unit 115.

The power detector 113 may detect an output current and/or an output voltage of the AC/DC converter 111, and may transfer information about the detected current and/or the detected voltage to the control/communication unit 115. As another example, the power detector 113 may detect an input current and/or an input voltage of the power converter 114.

The power converter 114 may generate power by converting a DC voltage to an AC voltage, for example, using a switching pulse signal in a band of a few megahertz (MHz) to tens of MHz. In other words, the power converter 114 may convert a DC voltage to an AC voltage using a resonance frequency, and may generate a communication power to be used for communication and/or a charging power to be used for charging, each of which may be used by the target device 120. Examples of the communication power and the charging power are described with reference to FIG. 3.

The control/communication unit 115 may control a frequency of a switching pulse signal. Under the control of the control/communication unit 115, the frequency of the switching pulse signal may be determined. For example, by controlling the power converter 114, the control/communication unit 115 may generate a modulation signal to be transmitted to the target device 120. In this example, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication using various schemes. For example, the control/communication unit 115 may turn on or off a switching pulse signal, may perform delta-sigma modulation, and the like. As another example, the control/communication unit 115 may generate a pulse-width modulation (PWM) signal with a predetermined envelope.

The control/communication unit 115 may perform out-band communication using a communication channel. For example, the control/communication unit 115 may include a communication module, such as a ZigBee module, a BLUETOOTH® module, and the like. The control/communication unit 115 may transmit or receive data to or from the target device 120 via the out-band communication.

The source resonator 116 may transfer electromagnetic energy to the target resonator 121. For example, the source resonator 116 may transfer, to the target device 120, the communication power or the charging power through magnetic coupling with the target resonator 121.

The target resonator 121 may receive the electromagnetic energy from the source resonator 116. For example, the target resonator 121 may receive, from the source device 110, the communication power or the charging power through magnetic coupling with the source resonator 116. As another example, the target resonator 121 may receive various messages from the source device 110 via the in-band communication.

The rectification unit 122 may generate a DC voltage by rectifying an AC voltage. For example, the rectification unit 122 may rectify an AC voltage received by the target resonator 121.

The DC/DC converter 123 may adjust a level of the DC voltage that is output from the rectification unit 122, for example, based on a capacity of the charging unit 125. For example, the DC/DC converter 123 may adjust the level of the DC voltage output from the rectification unit 122 from 3 volts to 10 volts.

The switch unit 124 may be turned on or off, under the control of the control/communication unit 126. While the switch unit 124 is turned off, the control/communication unit 115 of the source device 110 may detect a reflected wave. In other words, while the switch unit 124 is turned off, magnetic coupling between the source resonator 116 and the target resonator 121 may be prevented.

The charging unit 125 may include a battery. For example, the charging unit 125 may charge the battery using a DC voltage output from the DC/DC converter 123.

The control/communication unit 126 may perform in-band communication for transmitting or receiving data using a resonance frequency. For example, the control/communication unit 126 may demodulate a received signal by detecting a signal between the target resonator 121 and the rectification unit 122, or by detecting an output signal of the rectification unit 122. In other words, the control/communication unit 126 may demodulate a message received via the in-band communication.

In various examples, the control/communication unit 126 may adjust an impedance of the target resonator 121, to modulate a signal to be transmitted to the source device 110. For example, the control/communication unit 126 may modulate the signal to be transmitted to the source device 110, by turning on or off the switch unit 124. The control/communication unit 126 may increase the impedance of the target resonator 121 such that a reflected wave may be detected by the control/communication unit 115 of the source device 110. In this example, depending on whether the reflected wave is detected, the control/communication unit 115 of the source device 110 may detect a binary number "0" or "1."

The control/communication unit 126 may transmit, to the source device 110, a response message corresponding to the message received from the source device 110, using a shortened message that is generated by converting a general packet of a byte scale to a packet of a bit scale.

The control/communication unit 126 may perform out-band communication using a communication channel. For example, the control/communication unit 126 may include a communication module, such as a ZigBee module, a BLUETOOTH® module, and the like. The control/communication unit 126 may transmit or receive data to or from the source device 110 via the out-band communication.

The control/communication unit 115 may set a resonance bandwidth of the source resonator 116. Based on the set resonance bandwidth of the source resonator 116, a Q-factor (Qs) of the source 116 may be determined.

The control/communication unit 126 may set a resonance bandwidth of the target resonator 116. Based on the set resonance bandwidth of the target resonator 116, a Q-factor of the target resonator 121 may be determined. For example, the resonance bandwidth of the source resonator 116 may be set to be wider or narrower than the resonance bandwidth of the target resonator 121. Via communication, the source device 110 and the target device 120 may share information about the resonance bandwidths of the source resonator 116 and the target resonator 121. As an example, if a power higher than a reference value is requested from the target device 120, the Q-factor (Qs) of the source resonator 116 may be set to a value greater than 100. As another example, if a power lower than the reference value is requested from the target device 120, the Q-factor (Qs) of the source resonator 116 may be set to a value less than 100.

Qt may be used to indicate a Q-factor based on a change in a distance between the source resonator 116 and the target resonator 121. In this example, a change in resonance impedance, impedance-mismatching, a reflected signal, and the like, may occur which may cause Qt to be inversely proportional to a resonance bandwidth, as shown in Equation 1.

$$\frac{\Delta f}{f_0} = \frac{1}{Qt}$$ [Equation 1]

$$= \Gamma_{S,D} + \frac{1}{BW_S} + \frac{1}{BW_D}$$

In Equation 1, $f_o$ denotes a center frequency, $\Delta f$ denotes a bandwidth, $\Gamma_{S,D}$ denotes reflection loss between resonators, $BW_S$ denotes a resonance bandwidth of the source resonator 116, and $BW_D$ denotes a resonance bandwidth of the target resonator 121.

In a wireless power transmission, an efficiency U of the wireless power transmission may be represented by Equation 2 as shown below.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa}$$ [Equation 2]

In Equation 2, K denotes a coupling coefficient about energy coupling between the source resonator 116 and the target resonator 121, $\Gamma_S$ denotes a reflection coefficient of the source resonator 116, $\Gamma_D$ denotes a reflection coefficient of the target resonator 121, $\omega_0$ denotes a resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes a Q-factor of the source resonator 116, $Q_D$ denotes a Q-factor of the target resonator 121, and $Q_K$ denotes a Q-factor regarding energy coupling between the source resonator 116 and the target resonator 121.

Referring to Equation 2, the Q-factor may be associated with an efficiency of the wireless power transmission. In this example, the Q-factor may be set to a larger value in order to increase the efficiency of the wireless power transmission. In this instance, if $Q_S$ and $Q_D$ are respectively set to a larger value, the efficiency of the wireless power transmission may be reduced based on a change in the coupling coefficient K, a change in a distance between the source resonator 116 and the target resonator 121, a change in a resonance impedance, impedance mismatching, and the like.

If each of the resonance bandwidths of the source resonator 116 and the target resonator 121 is set to narrow, the impedance mismatching and the like may easily occur due to insignificant external influences. In consideration of the impedance mismatching, Equation 1 may be expressed by Equation 3 as shown below.

$$\frac{\Delta f}{f_0} = \frac{\sqrt{VSWR} - 1}{Qt\sqrt{VSWR}}$$ [Equation 3]

If the resonance bandwidth between the source resonator 116 and the target resonator 121, or a bandwidth of a impedance-matching frequency remains unbalanced, the efficiency of the wireless power transmission may be reduced based on a change in the coupling coefficient K, a change in a distance between the source resonator 116 and the target resonator 121, a change in a resonance impedance, impedance mismatching, and the like. According to Equation 1 through Equation 3, if the resonance bandwidth between the source resonator 116 and the target resonator 121, or the bandwidth of impedance-matching frequency remains unbalanced, the Q-factor of the source resonator 116 and the Q-factor of the target resonator 121 may remain unbalanced.

Figure 2:
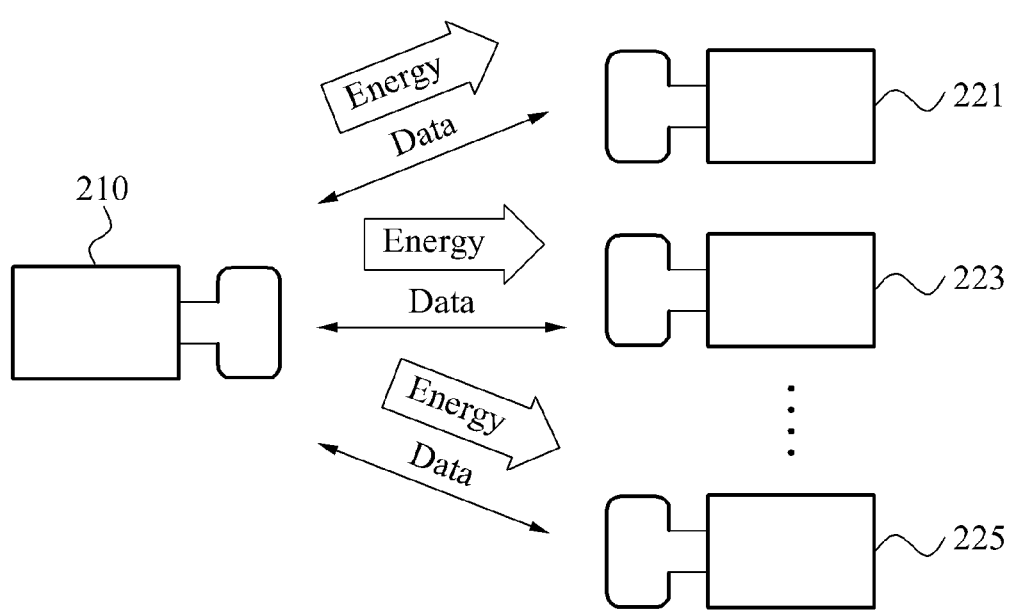
FIG. 2 is a diagram illustrating an example of an operation environment of a wireless power transmission and charging system.

FIG. 2 illustrates an example of an operation environment of a wireless power transmission and charging system.

Referring to FIG. 2, a source device 210 may wirelessly transmit energy to a plurality of target devices, for example, target devices 221, 223, and 225 simultaneously. That is, according to a resonance-based wireless power transmission scheme, the single source device 210 may simultaneously charge a plurality of target devices 221, 223, and 225.

According to the resonance-based wireless power transmission scheme, the source device 210 and the plurality of target devices 221, 223, and 225 may transmit and receive data via an in-band communication rather than an out-band communication.

In an in-band communication scheme, a power and a signal may be transmitted within a coupling area between a source resonator and a target resonator. In comparison to an out-band communication scheme, the in-band communication scheme may cause a little interference in peripheral devices. As described herein, the out-band communication may refer to communication using a communication channel, for example, a ZigBee channel, a BLUETOOTH® channel, and the like.

In the in-band communication, data may be transmitted using a power transmitting channel. Accordingly, if an amount of data increases, a power transmission efficiency may be reduced in the in-band communication scheme. However, in various examples herein the power transmission efficiency may be increased using a shortened packet of a bit scale. Additionally, a communication error may be reduced using a simple packet configuration, for example, when the shortened packet of the bit scale as illustrated in FIGS. 5 through 7A is used.

Figure 3:
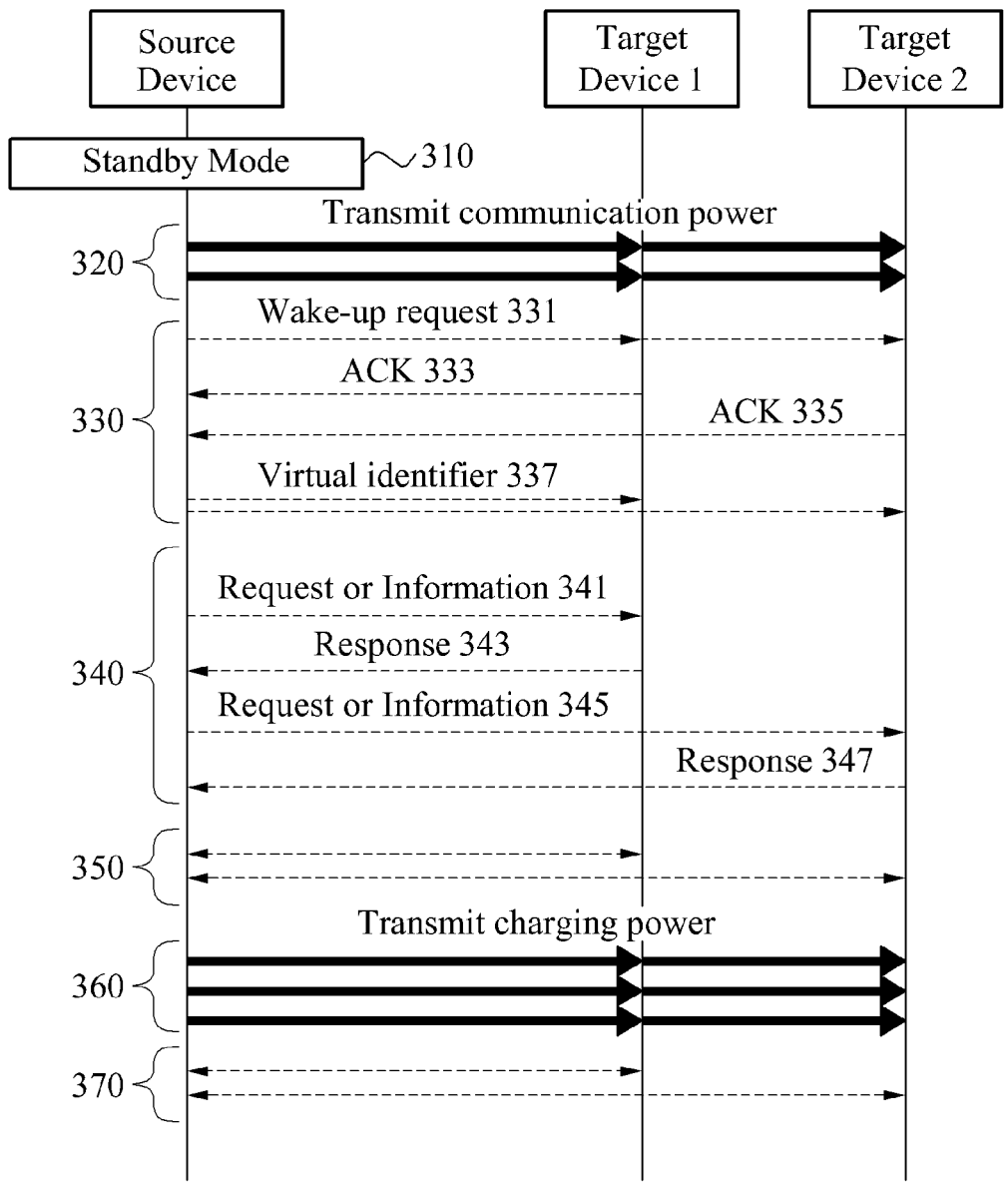
FIG. 3 is a diagram illustrating an example of a communication method of a wireless power transmission and charging system.

FIG. 3 illustrates an example of a communication method of a wireless power transmission and charging system.

Referring to FIG. 3, a source device, a target device 1, and a target device 2 may transmit and receive data via an in-band communication. Also, the source device, the target device 1, and the target device 2 may transmit and receive data via an out-band communication.

In 310, the source device is operated in a standby mode. For example, the source device may be operated in standby mode if a target is not detected. In response to the target device 1 and the target device 2 being detected, the source device may generate power to be used by the target devices for communication. In this example, the source device may transmit a test signal at each predetermined period, or may detect the target device 1 or the target device 2 using a pressure sensor. For example, if the target device 1 is disposed on the source device, the source device may detect the target device 1 using the pressure sensor included in the source device. Also, the source device may be switched from the standby mode to an access mode by a predetermined control signal. In this example, the access mode refers to a mode in which operations in 320 and 330 of FIG. 3 may be performed.

In 320, the source device transmits power to be used for communication to the target device 1 or the target device 2 through magnetic coupling. For example, the source device may generate "power to be used by converting a DC voltage to an AC voltage using a resonance frequency. Here, the power may refer to energy used for activating a communication module and a processor of the target device. The power may be transmitted during a predetermined time in a form of a constant wave (CW). The power may be referred to as communication power. The target device 1 and the target device 2 may receive a power requested for operating the communication module and the processor, by receiving the communication power.

In 330, the source device wakes up the target device, or assigns, to the target device, a virtual identifier used in a power transmission and control mode. Here, the power transmission and control mode refers to a mode in which operations in 340 through 370 of FIG. 3 may be performed. In 330, the target device may receive a wake-up request message from the source device, and may be assigned the virtual identifier. That is, in 330, the target device 1 and the target device 1 and the target device 2 may activate a communication and control function by receiving the wake-up request message, and may be assigned the virtual identifier from the source device.

As an example, 330 may include 331 in which the source device transmits a wake-up request message to the target device 1 and the target device 2, 333 in which the source device receives an acknowledge (ACK) message from the target device 1, and 335 in which the source device receives an ACK message from the target device 2. In this example, the ACK messages may include identifier information of each of the target device 1 and the target device 2. For example, the identifier information included in the ACK message may correspond to an intrinsic identifier of each of the target device 1 and the target device 2.

At least one of the wake-up request message and the ACK message may correspond to a shortened packet. The shortened packet may be generated by converting a general packet of a byte scale to a packet of a bit scale. Examples of the general packet and the shortened packet are described with reference to FIGS. 5 through 7A.

As another example, 330 may further include 337 in which a virtual identifier is assigned. For example, the source device may assign a virtual identifier to be used in a power transmission and charging mode, respectively to the target device 1 and the target device 2. The virtual identifier may be used instead of the intrinsic identifier of each of the target device 1 and the target device 2 in the power transmission and charging mode. In other words, the virtual identifier may correspond to a temporary identifier that may be used for charging.

As an example, the virtual identifier may be assigned using numbers from 1 to 8 based on a sequence of access. In comparison to the intrinsic identifier, the virtual identifier may be simply used for classifying the target device in the power transmission and control mode. The intrinsic identifier may corresponds to long data in byte units including a product model name, a serial number of product, manufacturer information, and the like, whereas the virtual identifier may correspond to short data, for example, data corresponding to 3 to 4 bits.

In 340, the source device performs communication with the target device 1, the target device 2, or both, using the shortened packet. That is, in 340, the source device may transmit a request message or an information message to the target device 1, the target device 2, or both, using the shortened packet. For example, the request message or the information message may include a message for verifying an amount of a power to be transmitted to the target device 1, the target device 2, or both, and a message for verifying state information of the target device 1, the target device 2, or both. Examples of the request message and the information message are described with reference to FIG. 7A.

Figure 5:
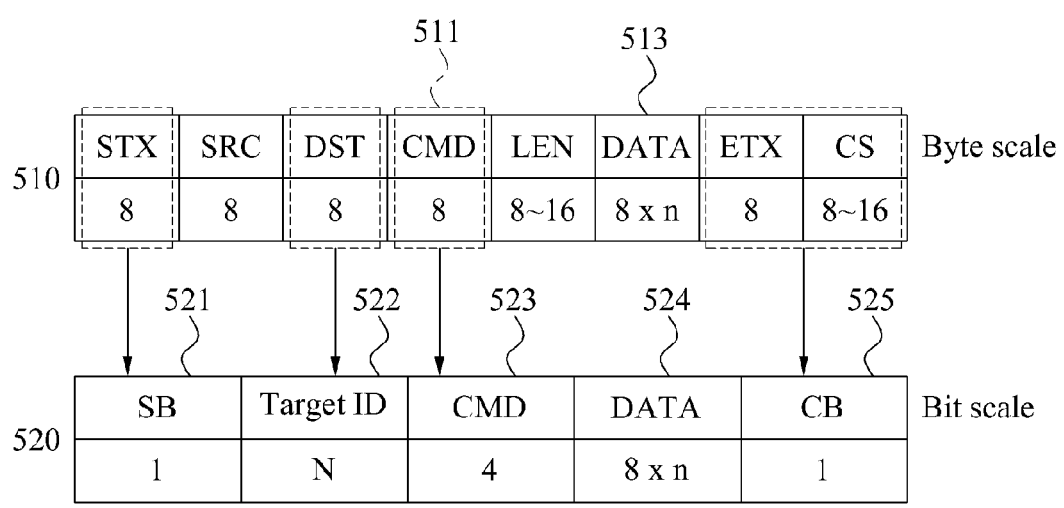
FIG. 5 is a diagram illustrating an example of a relationship between a general packet and a shortened packet.
Figure 6:
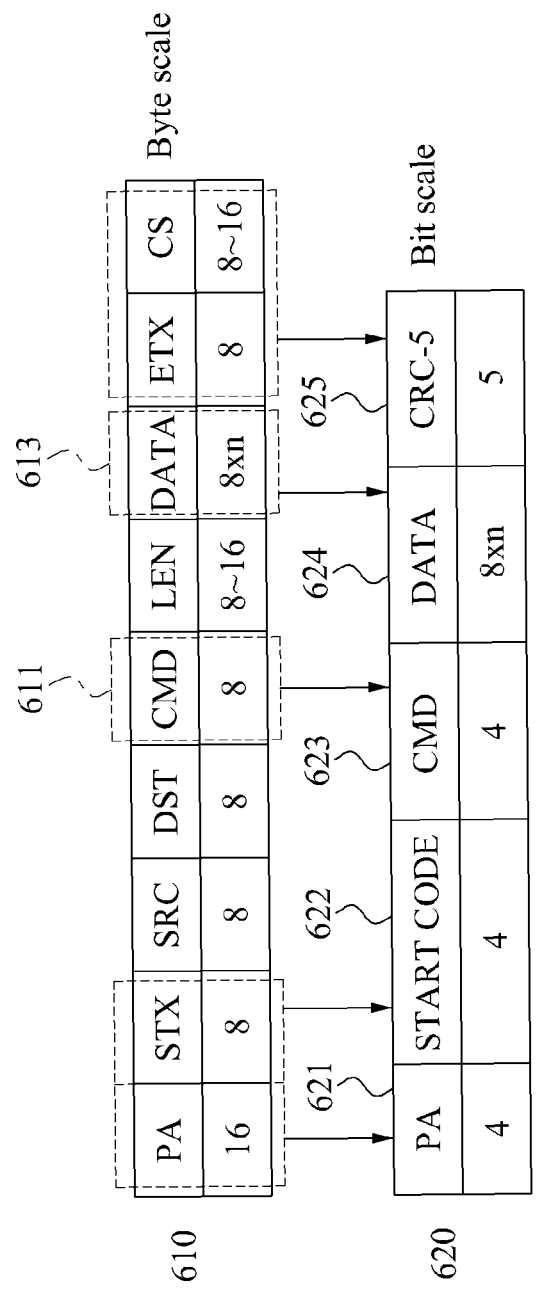
FIG. 6 is a diagram illustrating another example of a relationship between a general packet and a shortened packet.

In this instance, 340 may include 341 in which the source device transmits a request message or an information message to the target device 1, and 343 in which the source device receives a response message from the target device 1. Also, 340 may further include operations of 345 in which the source device transmits a request message or an information message to the target device 2, and 347 in which the source device receives a response message from the target device 2. The request message or the information message may be configured as illustrated in the example of FIG. 5, and the response message may be configured as illustrated in the example of FIG. 6.

In 350, the source device may transmit a predetermined command to the target device 1, the target device 2, or both, or may direct a predetermined operation. In this example, 350 may be performed or omitted completely. For example, if the source device wants to direct the target device 2 to perform a predetermined operation, the source device may transmit, to the target device 2, a message for directing the predetermined operation.

In 360, the source device transmits a charging power used for charging to the target device 1, the target device 2, or both. That is, the source device may transmit the charging power in 360 after verifying the state information, and the like of the target devices in 340. The charging power may be constantly transmitted during a predetermined time, and may be transmitted at a higher power level in comparison to the communication power. As a non-limiting example, a power level of the communication power may correspond to 0.1 to 1 Watt (W), and a power level of the charging power may be 1 to 20 W.

After the charging power is transmitted during the predetermined time, the source device may perform the communication again with the target device 1, the target device 2, or both, in 370. For example, if the target device 2 is determined to be completely charged, the source device may request suspension of the charging to the target device 2, in 370. Also, the source device may transmit a message for requesting state information in 370, in order to verify a charging state of the target device 1, the target device 2, or both.

Figure 4:
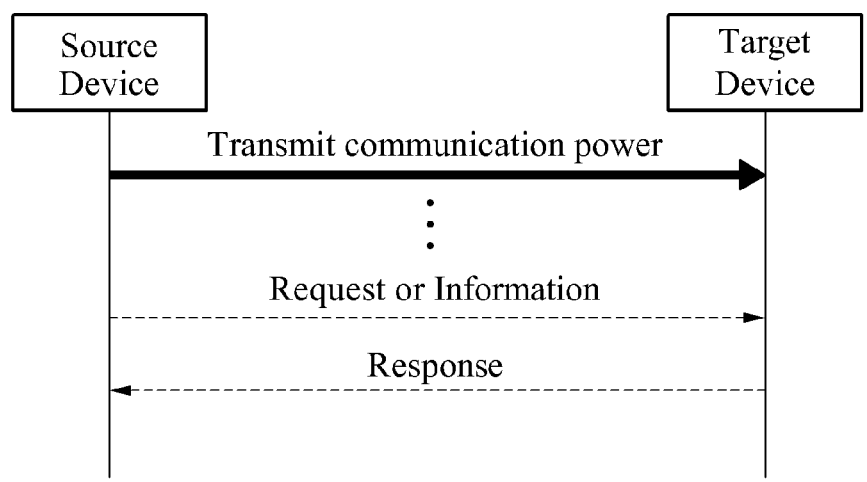
FIG. 4 is a diagram illustrating an example of communication between the source device and the target device of FIG. 3.

FIG. 4 illustrates an example of communication between the source device and the target device of FIG. 3.

Referring to FIG. 4, the source device may generate a communication power. The communication power may be used by the target device to communicate with other devices, for example, the source device. The source may generate the communication power by converting a DC voltage to an AC voltage using a resonance frequency, and may transmit the communication power to the target device through magnetic coupling. After the communication power is transmitted, communication may be performed between the source device and the target device.

The source device may transmit a request message or an information message to the target device via an in-band communication or an out-band communication. For example, the request message or the information message may include various fields of a bit scale. The various fields may include a field to indicate a start of the request message or the information message, a field to indicate an identifier of the target device, a field to indicate a command to be transferred to the target device, a check field to check an error of the request message or the information message, and the like.

As an example, the target device may transmit, to the source device, a response message corresponding to the request message or the information message via the in-band communication or the out-band communication. For example, the response message may include various fields of a bit scale. The various fields may include a field to indicate a start of the response message, a field to indicate a command to be transferred to the source device, a field to indicate data to be transferred to the source device, a field to check an error of the response message, and the like.

A detailed description regarding the request message or the information message, and the response message will be provided hereinafter with reference to FIGS. 5 and 6.

FIG. 5 illustrates an example of a relationship between a general packet 510 and a shortened packet 520.

In FIG. 5, the general packet 510 and the shortened packet 520 may indicate a format of a message to be transmitted from a source device to a target device.

Referring to FIG. 5, the general packet 510 includes multiple fields of a byte scale. That is, each size of the fields included in the general packet 510 may correspond to 8×N bytes, N being an integer greater than 1. The general packet 510 includes a start of text (STX) field to indicate a start of the packet, a source (SRC) field to indicate an address of transmission side, a destination (DST) field to indicate an address of reception side, a command (CMD) field 511 to indicate a command to be transferred from the transmission side to the reception side, a length (LEN) field to indicate a length of data, or a length of a DATA field 513, the DATA field 513 including data associated with the command, an end of text (ETX) field to indicate an end of the packet, and a check sum (CS) field to check an error of the packet.

The source device may transmit, to the target device, the shortened packet 520 by converting the general packet 510 of a byte scale to a packet of a bit scale. For example, after the target device is detected, the source device may transmit a message to the target device using the general packet 510 in 330 of FIG. 3, and may transmit a message to the target device using the shortened packet 520 in 340, 350, and 370 of FIG. 3.

The shortened packet 520 may include multiple fields of a bit scale. That is, a size of the fields included in the shortened packet 520 may correspond to N bits, N being an integer greater than 1. A configuration of the shortened packet 520 may be applied to the request message or the information message. For example, a configuration of the request message or the information message may be the same as the configuration of the shortened packet 520. The shortened packet 520 may include a start bit field 521 to indicate a start of the packet, a Target ID field 522 to indicate an identifier of the target device, a CMD field 523 to indicate a command to be transferred to the target device, a check bit (CB) field 525 to check an error of the shortened packet 520, and the like. The shortened packet 520 may further include a DATA field 524 including data associated with the command.

A length of the target ID field 522 may be determined based on the number of target devices that are charged by the source device. For example, if 8 or fewer target devices are charged by the source device, the length of the target ID field 522 may be determined to be 3 to 4 bits. In some examples, the target ID field 522 may include a virtual identifier.

FIG. 6 illustrates another example of a relationship between a general packet 610 and a shortened packet 620.

In FIG. 6, the general packet 610 and the shortened packet 620 may indicate a format of a message to be transmitted from a target device to a source device.

Referring to FIG. 6, the general packet 610 includes multiple fields of a byte scale. That is, each size of the fields included in the general packet 610 may correspond to 8×N bytes, N being an integer greater than 1. The general packet 610 includes a preamble (PA) field to be added in order to prevent packet loss in a wireless environment, an STX field to indicate a start of the packet, an SRC field to indicate an address of transmission side, a DST field to indicate an address of reception side, a CMD field 611 to indicate a command to be transferred from the transmission side to the reception side, an LEN field to indicate a length of data, or a length of DATA field 613, the DATA field 613 including data associated with the command, an ETX field to indicate an end of the packet, a CS field to check an error of the packet, and the like.

The target device may transmit, to the source device, the shortened packet 620 by converting the general packet 610 of a byte scale to a packet of a bit scale. For example, after a wake-up request message is received from the source device, the target device may transmit a message to the source device using the general packet 610 in 330 of FIG. 3, and may transmit a message to the source device using the shortened packet 620 in 340, 350, and 370 of FIG. 3. Because only a target device, from among a plurality of target devices, designated in the target ID field 522 may respond to a message received from the source device, the field to indicate the address of the reception side may be omitted from the shortened packet 620.

The shortened packet 620 may include multiple fields of a bit scale. That is, a size of the fields included in the shortened packet 620 may correspond to N bits, N being an integer greater than 1. A configuration of the shortened packet 620 may be applied to the response message. For example, a configuration of the response message may be the same as the configuration of the shortened packet 620. For example, the shortened packet 620 may include a PA field 621 to be added in order to prevent packet loss in a wireless environment, a START CODE field 622 to indicate a start of the packet, a CMD field 623 to indicate a command to be transferred to the source device, a DATA field 624 to indicate data associated with the command, a CRC-5 field 625 to check an error of the shortened packet 620, and the like. Here, the PA field 621 may correspond to a type of dummy data. A length of the DATA field 624 may be variable based on a type of data or command. Accordingly, an entire length of the shortened packet 620 may vary based on the length of the DATA field 624. A CRC code may be included in the CRC-5 field 625 in order to check an error regardless of the number of bits, based on the shortened packet 620 having a variable length.

FIG. 7A illustrates examples of types of commands.

One code, among codes illustrated in FIG. 7A, may be included in the CMD field 523 of FIG. 5 or the CMD field 623 of FIG. 6. Commands illustrated in FIG. 7A are merely examples. It should be understood that a length of code may be increased to 4 bits, 8 bits, 12 bits, and the like. For example, although not shown in FIG. 7A, a command to verify an amount of a power to be transmitted to a target device may be added.

Reset Command

The reset command may be used in 340, 350, or 370 of FIG. 3. For example, if it is determined that an error occurs in an operation of the target device, a source device may input a code such as 0001 in the CMD field 523, and may transmit, to the target device, the shortened packet 520 including the code 0001 inserted in the CMD field 523. That is, the reset command may request a reset of the target device in response to an error occurring in an operation of the target device. In response to receiving the reset command, the target device may transmit an ACK message to the source device. Also, the target device may perform a system reset in response to receiving the reset command.

Target Input Voltage and Current Request Command

The target input voltage and current request command may be used for verifying a power reception state of the target device. For example, the target input voltage and current request command may request an input voltage value and an input current value of the target device. The source device may insert a code such as 0010 to the CMD field 523 in order to verify the power reception state of the target device, and may transmit, to the target device, the shortened packet 520 including the code 0010 inserted in the CMD field 523.

Target Input Voltage and Current Response Command

The target input voltage and current response command may be used for a response to the target input voltage and current request command. For example, the target input voltage and current response command may correspond to a response message to the request for the input voltage value and the input current value of the target device. If the shortened packet 520 including the code for the request command inserted in the CMD field 523 is received, the target device may measure the input voltage and the input current. Here, the input voltage and the input current may correspond to an output voltage and an output current of the rectification unit 122 of FIG. 1. Also, the input voltage and the input current may correspond to an input voltage and an input current of the rectification unit 122 of FIG. 1.

The target device may transmit, to the source device, the shortened packet 620 including the code such as 0010 inserted in the CMD field 623. In this example, the DATA field 624 of the shortened packet 620 may include the measured input voltage value and the measured input current value of the target device. The source device may verify a power transmission efficiency based on the measured input voltage value and the measured input current value of the target device. For example, the source device may verify an amount of the received power based on the measured input voltage value and the measured input current value of the target device, and may calculate the power transmission efficiency based on a proportion of the amount of the received power to the amount of the transmitted power.

Target DC/DC Output Voltage and Current Request Command

The target DC/DC output voltage and current request command may be used for verifying an amount of a power to be supplied to a load of the target device. For example, the target DC/DC output voltage and current request command may request a DC/DC output voltage value and a DC/DC output current value of the target device. In order to verify the amount of the power to be supplied to the load of the target device, the source device may insert a code such as 0011 in the CMD field 523, and may transmit, to the target device, the shortened packet 520 including the code 0011 inserted in the CMD field 523.

Target DC/DC Output Voltage and Current Response Command

The target DC/DC output voltage and current response command may be used for a response to the target DC/DC output voltage and current request command. For example, the target input voltage and current response command may correspond to a response to the request for the DC/DC output voltage value and the DC/DC output current value of the target device. If the shortened packet 520 including the code such as 0011 inserted in the CMD field 523 is received, the target device may measure the DC/DC output voltage value and the DC/DC output current value. Here, the DC/DC may correspond to the DC/DC converter 123 of FIG. 1. The target device may transmit, to the source device, the shortened packet 620 including the code such as 0011 inserted in the CMD field 623. In this example, the DATA field 624 of the shortened packet 620 may include the measured DC/DC output voltage value and the measured DC/DC output current value.

ACK Command

The ACK command may be used for acknowledging reception of a message.

NACK Command

The NACK command may be used in a case where an error occurs in receiving a message.

Power ON Request Command

The power ON request command may be used when the switch unit 124 of FIG. 1 is requested to be powered ON. For example, the power ON request command may correspond to a command to direct a power supply to a load. If the power ON request command is received, the target device may initiate the power supply to the load.

Power OFF Request Command

The power OFF request command may be used when the switch unit 124 of FIG. 1 is requested to be powered OFF. For example, the power OFF request command may request suspension of the power supply to the load. If the power OFF request command is received, the target device may suspend the power supply to the load. The source device may use the power OFF request command when a power supply to a predetermined target device, among a plurality of target devices, is to be suspended. For example, the source device may transmit the power OFF request command to a target device having a power transmission efficiency less than a predetermined value.

Target State Information Request Command

The target state information request command may be used to request state information of the target device. For example, if a charging state, temperature, and the like of the target device are requested to be verified, the source device may insert a code such as 0111 in the CMD field 523, and may transmit the shortened packet 520 to the target device.

Target State Information Response Command

The target state information response command may correspond to a response to the request for the state information of the target device. If the target state information request command is received, the target device may verify the charging state, the temperature, and the like, and may transmit, to the source device, the shortened packet 620 including the code such as 0111 inserted in the CMD field 623. In this example, the DATA field 624 of the shortened packet 620 may include data regarding the charging state, or the temperature. The charging state may correspond to an extent of a battery of the target device being charged.

Access Standard Command

The access standard command may be used for transferring a predetermined communication regulation to the target device. For example, the source device may transmit, to a plurality of target devices, a communication interval, a communication slot, a response regulation, and the like, using the access standard command. In this example, the communication interval, the communication slot, the response regulation, and the like may be inserted in the DATA field 524.

Target ID for Charging Request Command

The target device may request an identifier for charging, by transmitting, to the source device, the shortened packet 620 including a code such as 1010 inserted in the CMD field 623. In this example, the identifier for charging may refer to a virtual identifier that may be used in a power transmission and control mode, and may be assigned in 330 of FIG. 3.

Target ID for Charging Response Command

The source device may insert the code such as 1010 in the CMD field 523, insert the identifier for charging in the DATA field 524, and transmit the shortened packet 520 to the target device.

Target Device Registration Information Request Command

The source device may use the target device registration information request command to request registration information of the target device. The registration information of the target device may refer to system information of the target device. For example, the registration information of the target device may include a type of product such as a television (TV), a camera, a cell phone, and the like, manufacturer information, a product model name, a battery type, a charging scheme, an impedance value of a load, information about a characteristic of a target resonator, information about a used frequency band, an amount of a power to be used, an intrinsic identifier, product version information or standards information, and the like. In this example, the intrinsic identifier may correspond to an N-byte serial number, and also may correspond to a short identifier generated by converting the serial number to an M-bit serial number. The information about the characteristic of the target resonator may include a value Q and a value K of the target resonator. Also, the information about the characteristic of the target resonator may further include information about a type of resonator, such as a resonator having a two-dimensional (2D) structure, or a resonator having a three-dimensional (3D) structure, an L/C value of the resonator, impedance-matching information, and the like.

As an example, if a code such as 1110 is inserted in the CMD field 523, and the code such as 0001 is inserted in the DATA field 524, it may be a request for a product type. As another example, if the code 1110 is inserted in the CMD field 523, and the code 0011 is inserted in the DATA field 524, it may be a request for a product model name. That is, information to be requested may be variable based on a scheme agreed on between the source device and the target device.

The source device may transmit, to the target device, the target device registration information request message in 330 of FIG. 3. For example, the source device may detect the target device, and may transmit, to the target device, the target device registration information request command in order to verify the registration information of the detected target device. Also, the source device may transmit, to the target device, the target device registration information request message in 340 of FIG. 3.

Target Device Registration Information Response Command

The target device may use the target device registration information response command, as a corresponding response to the target device registration information request command. For example, the target device registration information response command may correspond to a response to the request for the registration information of the target device. In this example, the DATA field 624 of the shortened packet 620 may include the registration information of the target device.

The target device may receive the target device registration information request command in 330 of FIG. 3, and may transmit the target device registration information response command to the source device. For example, an ACK message to be transmitted in 333 or 335 of FIG. 3 may include the registration information of the target device. Also, the target device may receive the target device registration information request command in 341 of FIG. 3, and may transmit, to the source device, the target device registration information response command in 343.

Conversion from Shortened Packet to General Packet Request Command

The Conversion from shortened packet to general packet request command may correspond to a command to request a change of a message format. For example, the source device or the target device may perform communication using a general packet. If a code such as 1111 is inserted in the CMD field 523 or the CMD field 624, the source device or the target device may change a format of the packet for the communication. That is, if the shortened packet 520 or 620 including the code such as 1111 inserted in the CMD field 523 or the CMD field 624 while performing the communication using the shortened packet 520 or 620, a subsequent communication may be performed using the general packet 510 or 610.

Target Resonator ON/OFF Request Command

In FIG. 7A, the target resonator ON/OFF request command may control the target resonator to be powered ON and OFF. The target resonator ON/OFF request command may use a code such as 0000. Also, a command to control the target resonator to be powered ON, and a command to control the target resonator to be powered OFF may have different codes. If a resonator of a predetermined target device, among a plurality of target devices, is requested to be powered OFF, the source device may transmit, to the corresponding target device, the command to control the target resonator to be powered OFF. The target device receiving the command to control the target resonator to be powered OFF may control the target resonator to be powered OFF.

Figure 7B:
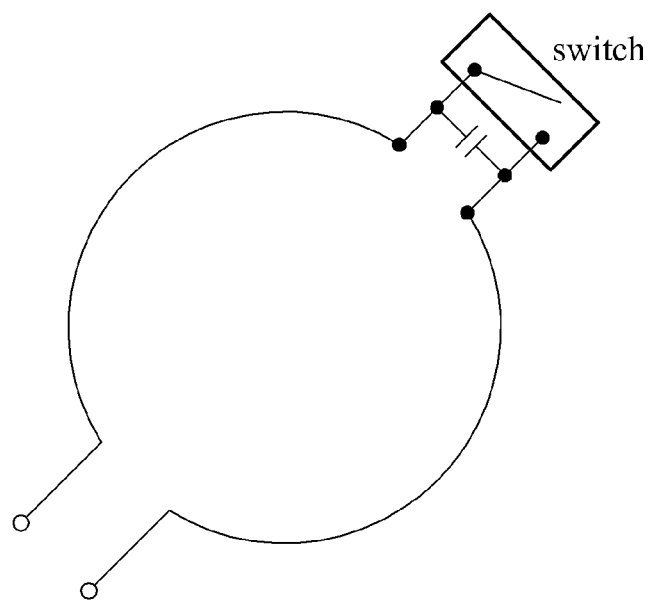
FIGS. 7B and 7C are diagrams illustrating an example of an operation of a target device that receives a target resonator off/on request, among the commands illustrated in FIG. 7A.
Figure 7C:
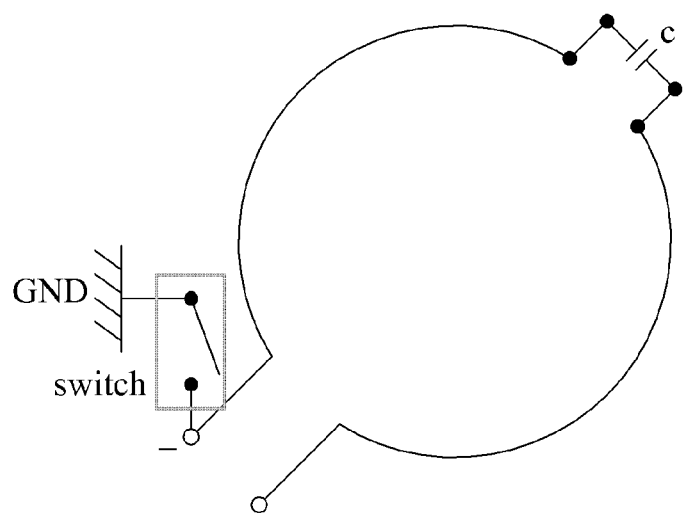

For example, the target resonator may be powered ON or powered OFF by controlling switches illustrated in FIGS. 7B and 7C to be powered ON or powered OFF. In FIG. 7C, if the switch is powered OFF, the target resonator may be powered OFF. However, in FIG. 7B, if the switch is powered ON, a capacitor element may be removed, and accordingly the target resonator may be powered OFF. Additionally, the target device may control the target resonator 121 of FIG. 1, by disconnecting the target resonator 121 from the rectification unit 122, or the rectification unit 122 from the DC/DC converter 123.

In various examples, a source resonator, a repeater resonator, and/or the target resonator may be configured as a helix coil structured resonator, a spiral coil structured resonator, a meta-structured resonator, or the like.

Hereinafter, related terms will be described for concise understanding. All materials have a unique magnetic permeability, that is, Mu, and a unique permittivity, that is, epsilon. The magnetic permeability indicates a ratio between a magnetic flux density that occurs with respect to a given magnetic field in a corresponding material and a magnetic flux density that occurs with respect to the given magnetic field in a vacuum state.

The permittivity indicates a ratio between an electric flux density that occurs with respect to a given electric field in a corresponding material and an electric flux density that occurs with respect to the given electric field in a vacuum state. The magnetic permeability and the permittivity may determine a propagation constant of a material in a given frequency or a given wavelength. An electromagnetic characteristic of the material may be determined based on the magnetic permeability and the permittivity. For example, a material having a magnetic permeability or a permittivity that is not found in nature and that is artificially designed is referred to as a metamaterial. A metamaterial may be easily disposed in a resonance state even in a relatively large wavelength area or a relatively low frequency area. For example, even though a material size rarely varies, the metamaterial may be easily disposed in the resonance state.

FIG. 8 is an example of a two-dimensional (2D) illustration of a resonator.

Referring to FIG. 8, resonator 800 includes a transmission line, a capacitor 820, a matcher 830, and conductors 841 and 842. The transmission line includes a first signal conducting portion 811, a second signal conducting portion 812, and a ground conducting portion 813.

The capacitor 820 may be inserted in series between the first signal conducting portion 811 and the second signal conducting portion 812, and an electric field may be confined within the capacitor 820. The transmission line may include at least one conductor in an upper portion of the transmission line, and at least one conductor in a lower portion of the transmission line. Current may flow through the at least one conductor disposed in the upper portion of the transmission line and the at least one conductor disposed in the lower portion of the transmission may be electrically grounded. A conductor disposed in an upper portion of the transmission line may be referred to as the first signal conducting portion 811 and the second signal conducting portion 812. A conductor disposed in the lower portion of the transmission line may be referred to as the ground conducting portion 813.

The transmission line may include the first signal conducting portion 811 and the second signal conducting portion 812 in the upper portion of the transmission line, and may include the ground conducting portion 813 in the lower portion of the transmission line. The first signal conducting portion 811 and the second signal conducting portion 812 may face the ground conducting portion 813. For example, current may flow through the first signal conducting portion 811 and the second signal conducting portion 812.

In this example, one end of the first signal conducting portion 811 is shorted to a conductor 842, and another end of the first signal conducting portion 811 is connected to the capacitor 820. One end of the second signal conducting portion 812 is shorted to the conductor 841, and another end of the second signal conducting portion 812 is connected to the capacitor 820. Accordingly, the first signal conducting portion 811, the second signal conducting portion 812, the ground conducting portion 813, and the conductors 841 and 842 are connected to each other such that the resonator 800 may have an electrically closed-loop structure. The term "loop structure" may include a polygonal structure, for example, a circular structure, a rectangular structure, and the like. "Having a loop structure" indicates a circuit that is electrically closed.

The capacitor 820 may be inserted into an intermediate portion of the transmission line. For example, the capacitor 820 may be inserted into a space between the first signal conducting portion 811 and the second signal conducting portion 812. The capacitor 820 may have a shape of a lumped element, a distributed element, and the like. As an example, a distributed capacitor having the shape of the distributed element may include zigzagged conductor lines and a dielectric material having a relatively high permittivity and that is located between the zigzagged conductor lines.

If the capacitor 820 is inserted into the transmission line, the resonator 800 may have a property of a metamaterial. A metamaterial indicates a material that has an electrical property that has not been discovered in nature and thus, may have an artificially designed structure. An electromagnetic characteristic of all the materials existing in nature have a unique magnetic permeability or a unique permittivity. Most materials have a positive magnetic permeability or a positive permittivity. In the case of most materials, a right hand rule may be applied to an electric field, a magnetic field, and a pointing vector, and thus, the corresponding materials may be referred to as right handed materials (RHMs). However, a metamaterial has a magnetic permeability or a permittivity that is absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The resonator 800 may have a negative magnetic permeability by appropriately adjusting the capacitance of the capacitor 820. In this example, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion for enabling the resonator 800 to have a zeroth order resonance characteristic in the target frequency, and the like. Based on at least one criterion from among the aforementioned criteria, the capacitance of the capacitor 820 may be determined.

The resonator 800, also referred to as the MNG resonator 800, may have a zeroth order resonance characteristic of having, as a resonance frequency, a frequency in which a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

In a near field, the electric field may be concentrated on the capacitor 820 inserted into the transmission line. In this example, due to the capacitor 820, the magnetic field may become dominant in the near field. The MNG resonator 800 may have a relatively high Q-factor using the capacitor 820 of the lumped element, and thus, it is possible to enhance an efficiency of power transmission. A Q-factor indicates a level of an ohmic loss or a ratio of a reactance with respect to a resistance in the wireless power transmission. The efficiency of the wireless power transmission may increase according to an increase in the Q-factor.

The matcher 830 may adjust a strength of a magnetic field of the MNG resonator 800. Accordingly, an impedance of the MNG resonator 800 may be determined by the matcher 830. Current may flow in the MNG resonator 800 via a connector, or may flow out from the MNG resonator 800 via the connector. The connector may be connected to the ground conducting portion 813 or the matcher 830. For example, a physical connection may be formed between the connector and the ground conducting portion 813, or between the connector and the matcher 830. As another example, power may be transferred through coupling, without using a physical connection between the connector and the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 includes the conductor 831 for the impedance-matching in a location that is separated from the ground conducting portion 813 by a distance h. In this example, the impedance of the resonator 800 may be changed by adjusting the distance h.

Although not illustrated in FIG. 8, a controller may be provided to control the matcher 830. In this example, the matcher 830 may change the physical shape of the matcher 830 based on a control signal generated by the controller. For example, the distance h between a conductor 831 of the matcher 830 and the ground conducting portion 813 may increase or decrease based on the control signal. Accordingly, the physical shape of the matcher 830 may be changed and the impedance of the resonator 800 may be adjusted.

As shown in FIG. 8, the matcher 830 may be configured as a passive element such as the conductor 831. For example, the matcher 830 may be an active element such as a diode, a transistor, and the like. If the active element is included in the matcher 830, the active element may be driven based on the control signal generated by the controller, and the impedance of the resonator 800 may be adjusted based on the control signal. In an example in which a diode is included in the matcher 830, the impedance of the resonator 800 may be adjusted based on whether the diode is in an on state or in an off state.

Although not illustrated in FIG. 8, a magnetic core may pass through the MNG resonator 800. The magnetic core may increase a power transmission distance.

Figure 9:
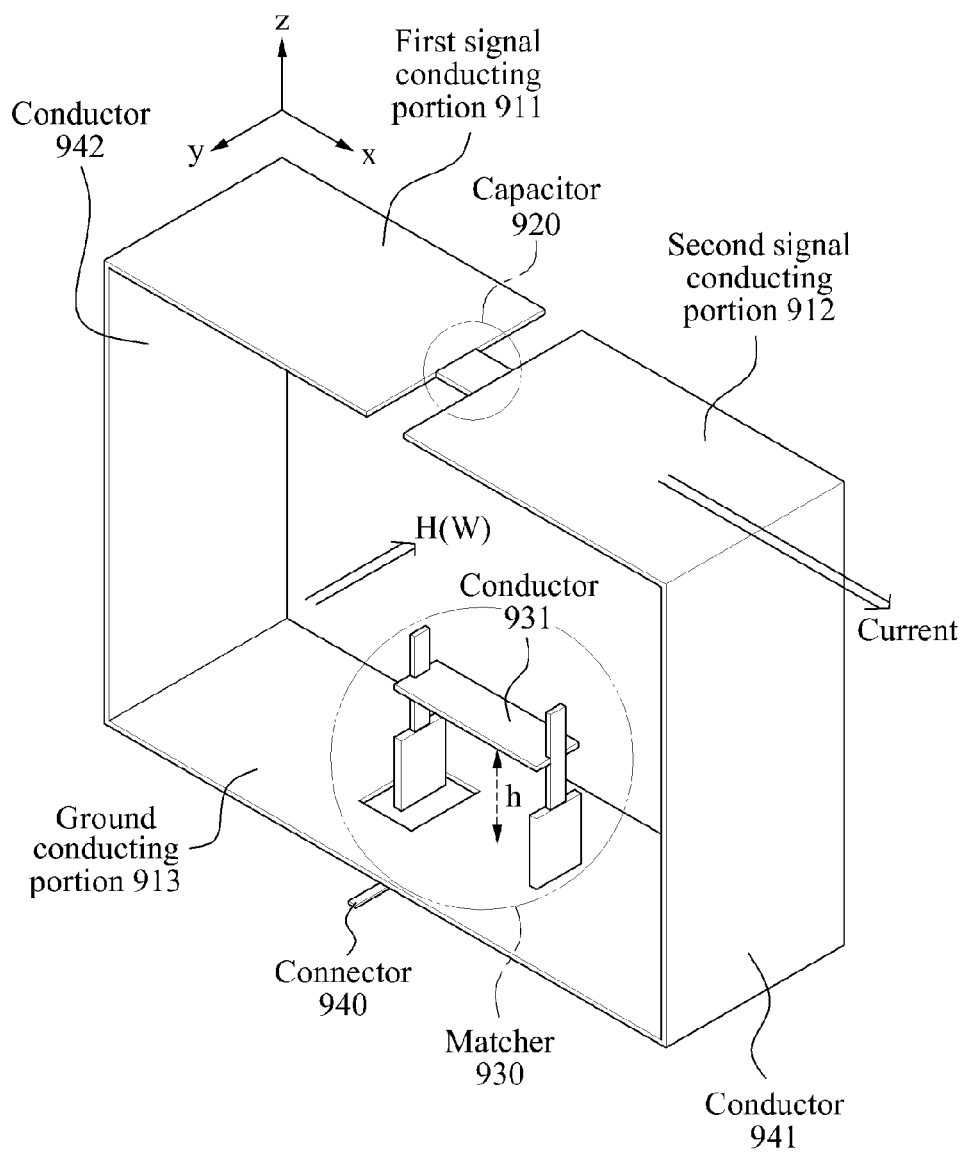

FIG. 9 is an example of a three-dimensional (3D) illustration of a resonator.

Referring to FIG. 9, resonator 900 includes a transmission line and a capacitor 920. The transmission line includes a first signal conducting portion 911, a second signal conducting portion 912, and a ground conducting portion 913. The capacitor 920 is inserted in series between the first signal conducting portion 911 and the second signal conducting portion 912 of the transmission line, and an electric field may be confined within the capacitor 920.

The transmission line includes the first signal conducting portion 911 and the second signal conducting portion 912 in an upper portion of the resonator 900, and includes the ground conducting portion 913 in a lower portion of the resonator 900. In this example, the first signal conducting portion 911 and the second signal conducting portion 912 face the ground conducting portion 913. Current may flow in an x direction through the first signal conducting portion 911 and the second signal conducting portion 912. Due to the current, a magnetic field H(W) may be formed in a −y direction. Alternatively, unlike the diagram of FIG. 9, the magnetic field H(W) may be formed in a +y direction.

One end of the first signal conducting portion 911 is shorted to a conductor 942, and another end of the first signal conducting portion 911 is connected to the capacitor 920. One end of the second signal conducting portion 912 is shorted to the conductor 941, and another end of the second signal conducting portion 912 is connected to the capacitor 920. Accordingly, the first signal conducting portion 911, the second signal conducting portion 912, the ground conducting portion 913, and the conductors 941 and 942 are connected to each other such that the resonator 900 has an electrically closed-loop structure.

As shown in FIG. 9, the capacitor 920 may be inserted into a space between the first signal conducting portion 911 and the second signal conducting portion 912. For example, the capacitor 920 may have a shape of a lumped element, a distributed element, and the like. As an example, a distributed capacitor having the shape of the distributed element may include zigzagged conductor lines and a dielectric material having a relatively high permittivity that is disposed between the zigzagged conductor lines.

As the capacitor 920 is inserted into the transmission line, the resonator 900 may have a property of a metamaterial. If a capacitance of the capacitor inserted as the lumped element is appropriately determined, the resonator 900 may have the characteristic of the metamaterial. Because the resonator 900 may have a negative magnetic permeability in a predetermined frequency band by adjusting the capacitance of the capacitor 920, the resonator 900 may also be referred to as an MNG resonator. Various criteria may be applied to determine the capacitance of the capacitor 920. For example, the various criteria may include a criterion for enabling the resonator 900 to have the characteristic of the metamaterial, a criterion for enabling the resonator 900 to have a negative magnetic permeability in a target frequency, a criterion for enabling the resonator 900 to have a zeroth order resonance characteristic in the target frequency, and the like. Based on at least one criterion from among the aforementioned criteria, the capacitance of the capacitor 920 may be determined.

The resonator 900, also referred to as the MNG resonator 900, may have a zeroth order resonance characteristic of having, as a resonance frequency, a frequency in which a propagation constant is "0". Because the resonator 900 may have the zeroth order resonance characteristic, the resonance frequency may be independent with respect to a physical size of the MNG resonator 900. By appropriately designing the capacitor 920, the MNG resonator 900 may sufficiently change the resonance frequency. Accordingly, the physical size of the MNG resonator 900 may not be changed.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. For example, because the MNG resonator 900 having the zeroth order resonance characteristic may have characteristics similar to a magnetic dipole, the magnetic field may become dominant in the near field. A relatively small amount of the electric field formed due to the insertion of the capacitor 920 may be concentrated on the capacitor 920, and thus, the magnetic field may become further dominant. The MNG resonator 900 may have a relatively high Q-factor using the capacitor 920 of the lumped element, and thus, it is possible to enhance an efficiency of power transmission.

The matcher 930 may be used to adjust the strength of magnetic field of the MNG resonator 900. An impedance of the MNG resonator 900 may be determined by the matcher 930. Current may flow in the MNG resonator 900 via a connector 940, or may flow out from the MNG resonator 900 via the connector 940. As an example, the connector 940 may be connected to the ground conducting portion 913 or the matcher 930.

For example, as shown in FIG. 9, the matcher 930 may be positioned within the loop formed by the loop structure of the resonator 900. The matcher 930 may adjust the impedance of the resonator 900 by changing the physical shape of the matcher 930. For example, the matcher 930 includes the conductor 931 for the impedance-matching in a location that is separated from the ground conducting portion 913 by a distance h. The impedance of the resonator 900 may be changed by adjusting the distance h.

Although not illustrated in FIG. 9, a controller may be provided to control the matcher 930. In this example, the matcher 930 may change the physical shape of the matcher 930 based on a control signal generated by the controller. For example, the distance h between the conductor 931 of the matcher 930 and the ground conducting portion 913 may increase or decrease based on the control signal. Accordingly, the physical shape of the matcher 930 may be changed and the impedance of the resonator 900 may be adjusted. The distance h between the conductor 931 of the matcher 930 and the ground conducting portion 913 may be adjusted using a variety of schemes. As one example, a plurality of conductors may be included in the matcher 930 and the distance h may be adjusted by adaptively activating one of the conductors. As another example, the distance h may be adjusted by adjusting the physical location of the conductor 931 up and down. The distance h may be controlled based on the control signal of the controller. The controller may generate the control signal using various factors. An example of the controller generating the control signal is described later.

As shown in FIG. 9, the matcher 930 may be a passive element such as the conductor 931. For example, the matcher 930 may be an active element such as a diode, a transistor, and the like. If the active element is included in the matcher 930, the active element may be driven based on the control signal generated by the controller, and the impedance of the resonator 900 may be adjusted based on the control signal. For example, if a diode is included in the matcher 930, the impedance of the resonator 900 may be adjusted based on whether the diode is in an on state or in an off state.

Although not illustrated in FIG. 9, a magnetic core may pass through the resonator 900 configured as the MNG resonator. The magnetic core may increase a power transmission distance.

Figure 10:
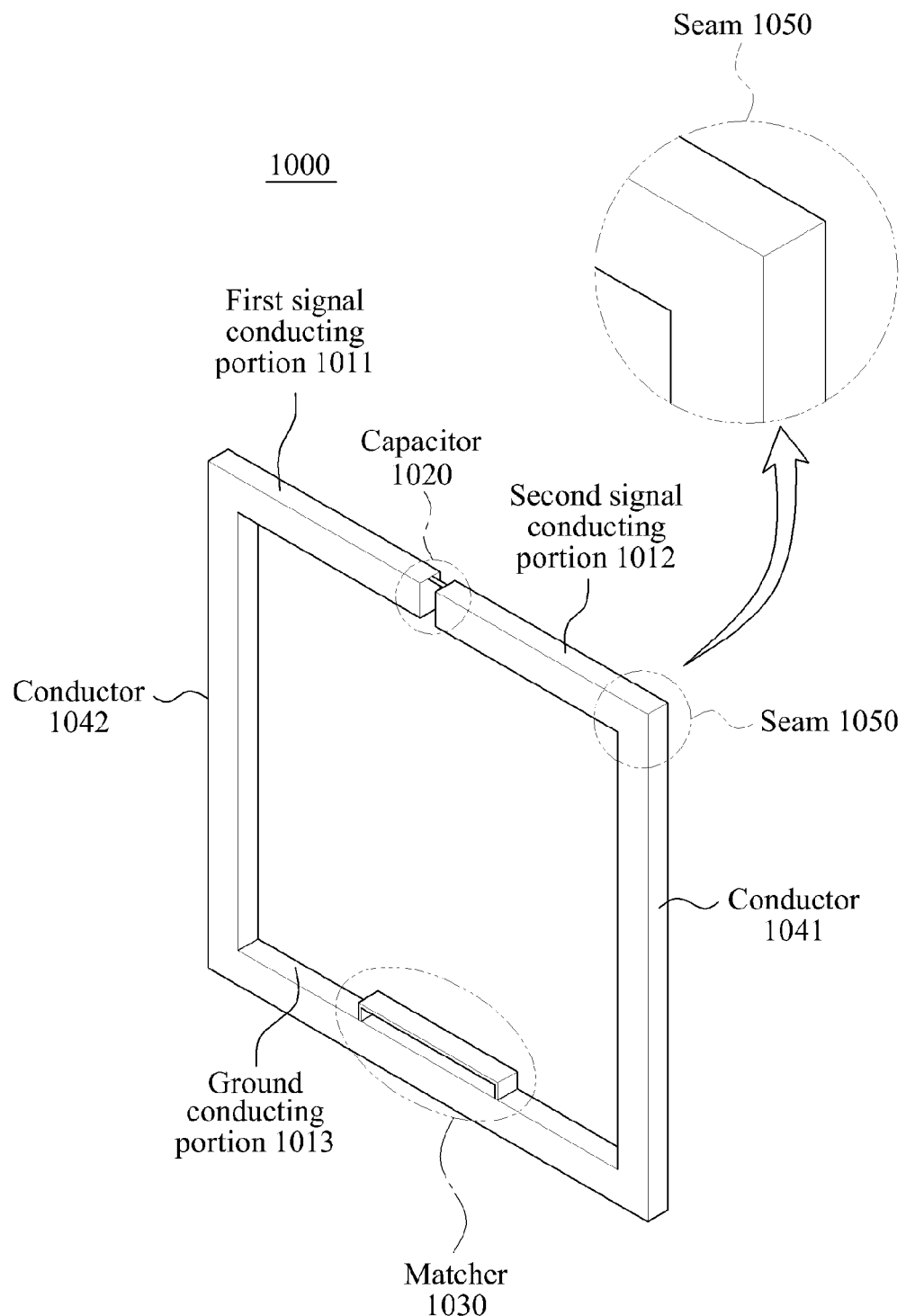

FIG. 10 illustrates an example of a resonator for a wireless power transmission configured as a bulky type.

Referring to FIG. 10, a first signal conducting portion 1011 and a conductor 1042 may be integrally formed of one piece instead of being separately manufactured and subsequently connected to each other. Similarly, the second signal conducting portion 1012 and a conductor 1041 may be integrally manufactured.

If the second signal conducting portion 1012 and the conductor 1041 are separately manufactured and then are connected to each other, a loss of conduction may occur due to a seam 1050. Accordingly, the second signal conducting portion 1012 and the conductor 1041 may be connected to each other without using a separate seam, that is, they may be seamlessly connected to each other. Accordingly, it is possible to decrease a conductor loss that is caused by the seam 1050. As another example, the second signal conducting portion 1012 and a ground conducting portion 1013 may be seamlessly and integrally manufactured. As another example, the first signal conducting portion 1011 and the ground conducting portion 1013 may be seamlessly and integrally manufactured. As another example, the first signal conducting portion 1011 and the conductor 1042 may be seamlessly manufactured. As another example, the conductor 1042 and the ground conducting portion 1013 may be seamlessly manufactured.

Referring to FIG. 10, a type of a seamless connection connecting at least two partitions into an integrated form is referred to as a bulky type.

Figure 11:
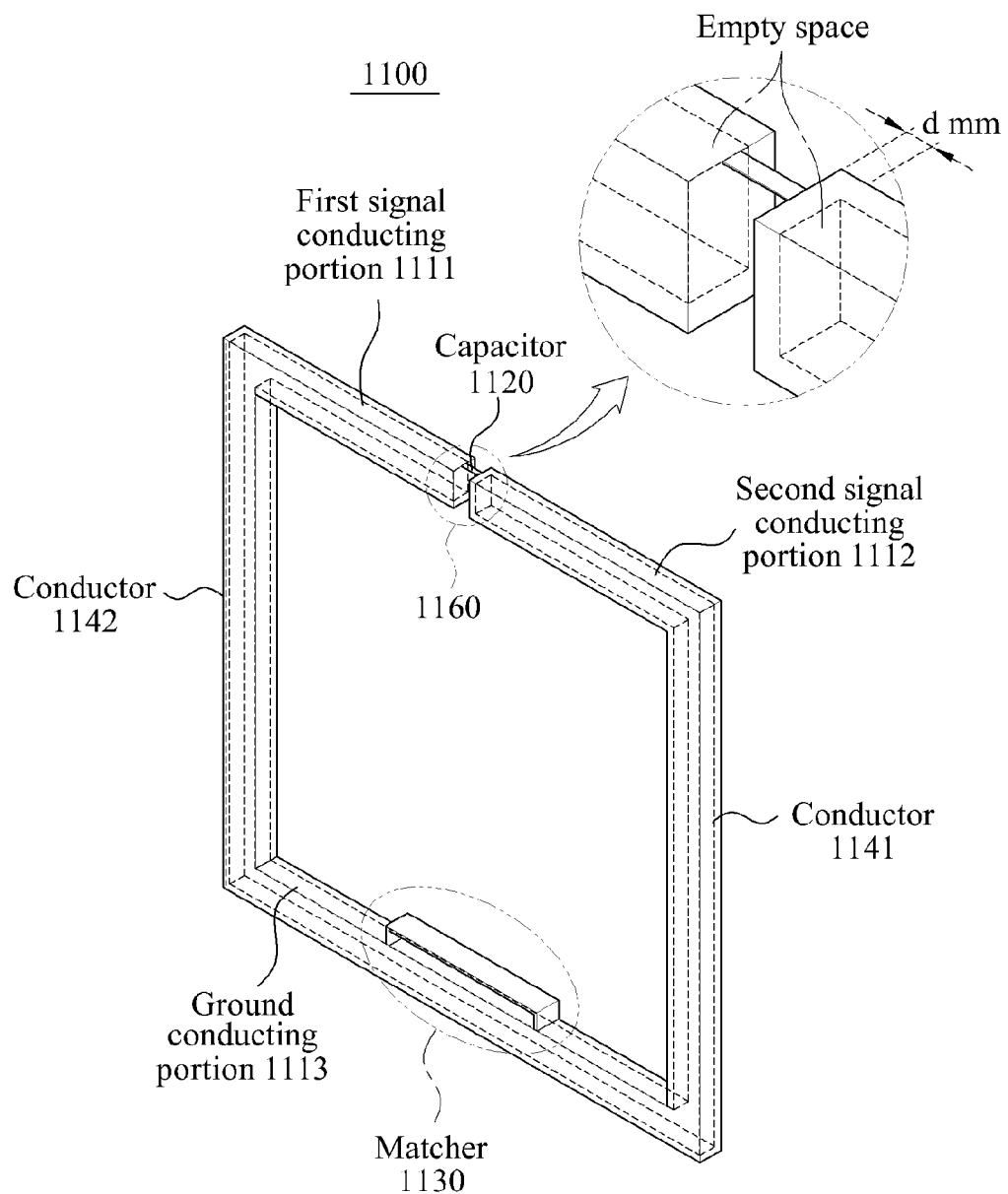

FIG. 11 illustrates an example of a resonator for a wireless power transmission, configured as a hollow type.

Referring to FIG. 11, one or more of a first signal conducting portion 1111, a second signal conducting portion 1112, a ground conducting portion 1113, and conductors 1141 and 1142 of the resonator 1100 configured as the hollow type may include an empty or hollow space inside.

In a given resonance frequency, an active current may be modeled to flow in only a portion of the first signal conducting portion 1111 instead of the entire first signal conducting portion 1111, only a portion of the second signal conducting portion 1112 instead of the entire second signal conducting portion 1112, only a portion of the ground conducting portion 1113 instead of the entire ground conducting portion 1113, and only a portion of the conductors 1141 and 1142 instead of the entire conductors 1141 and 1142. For example, if a depth of each of the first signal conducting portion 1111, the second signal conducting portion 1112, the ground conducting portion 1113, and the conductors 1141 and 1142 are significantly deeper than a corresponding skin depth in the given resonance frequency, it may be ineffective. The significantly deeper depth may increase a weight or manufacturing costs of the resonator 1100.

Accordingly, in the given resonance frequency, the depth of each of the first signal conducting portion 1111, the second signal conducting portion 1112, the ground conducting portion 1113, and the conductors 1141 and 1142 may be determined based on the corresponding skin depth of each of the first signal conducting portion 1111, the second signal conducting portion 1112, the ground conducting portion 1113, and the conductors 1141 and 1142. If each of the first signal conducting portion 1111, the second signal conducting portion 1112, the ground conducting portion 1113, and the conductors 1141 and 1142 has an appropriate depth deeper than a corresponding skin depth, the resonator 1100 may become light, and manufacturing costs of the resonator 1100 may also decrease.

For example, as shown in FIG. 11, the depth of the second signal conducting portion 1112 may be determined as "d" mm. In this example, d may be determined according to $$d = \frac{1}{\sqrt{\pi f \mu \sigma}}.$$

Here, f denotes a frequency, μ denotes a magnetic permeability, and σ denotes a conductor constant. As an example, if the first signal conducting portion 1111, the second signal conducting portion 1112, the ground conducting portion 1113, and the conductors 1141 and 1142 are made of a copper and have a conductivity of $5.8 \times 10^7$ Siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 12:
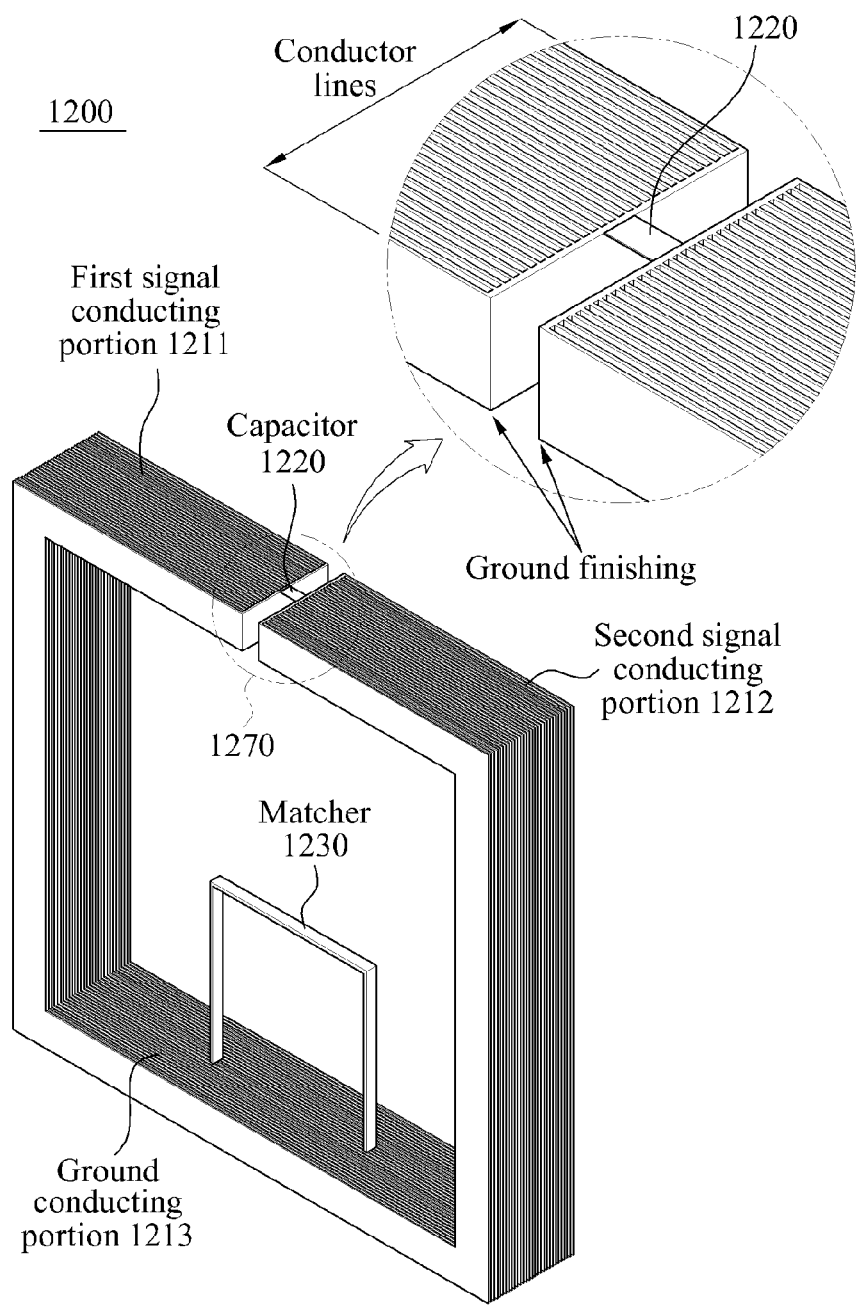

FIG. 12 illustrates an example of a resonator for a wireless power transmission using a parallel-sheet.

Referring to FIG. 12, the parallel-sheet may be applicable to each of a first signal conducting portion 1211 and a second signal conducting portion 1212 included in the resonator 1200.

Each of the first signal conducting portion 1211 and the second signal conducting portion 1212 may not be a perfect conductor, and thus, may have some resistance. Due to the resistance, an ohmic loss may occur. The ohmic loss may decrease a Q-factor and also decrease a coupling effect.

By applying the parallel-sheet to each of the first signal conducting portion 1211 and the second signal conducting portion 1212, it is possible to decrease the ohmic loss, and to increase the Q-factor and the coupling effect. Referring to a portion 1270 indicated by a circle, the parallel-sheet is applied, and each of the first signal conducting portion 1211 and the second signal conducting portion 1212 includes a plurality of conductor lines. The plurality of conductor lines are disposed in parallel, and are shorted at an end portion of each of the first signal conducting portion 1211 and the second signal conducting portion 1212.

By applying the parallel-sheet example to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

Figure 13:
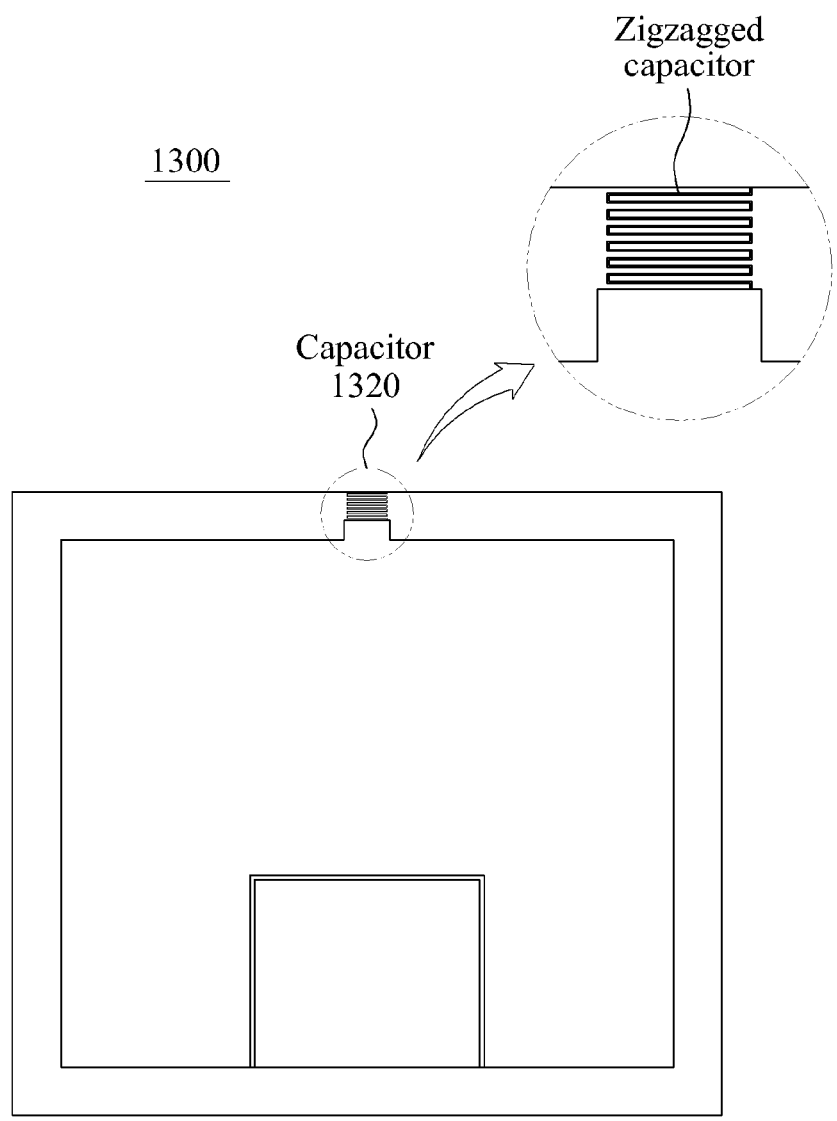

FIG. 13 illustrates an example of a resonator for a wireless power transmission, including a distributed capacitor.

Referring to FIG. 13, a capacitor 1320 included in resonator 1300 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1320 as a distributed element, it is possible to decrease the ESR. Loss caused by the ESR may decrease a Q-factor and a coupling effect.

As shown in FIG. 13, the capacitor 1320 as the distributed element may have a zigzagged structure. For example, the capacitor 1320 as the distributed element may be configured as a conductive line and a conductor having the zigzagged structure.

By including the capacitor 1320 as the distributed element, it is possible to decrease the loss occurring due to the ESR. In addition, by disposing a plurality of capacitors as lumped elements, it is possible to decrease the loss occurring due to the ESR. Because a resistance of each of the capacitors as the lumped elements decreases through a parallel connection, active resistances of parallel-connected capacitors as the lumped elements may also decrease and the loss occurring due to the ESR may decrease. For example, by including ten capacitors of 1 pF instead of using a single capacitor of 10 pF, it is possible to decrease the loss occurring due to the ESR.

Figure 14A:
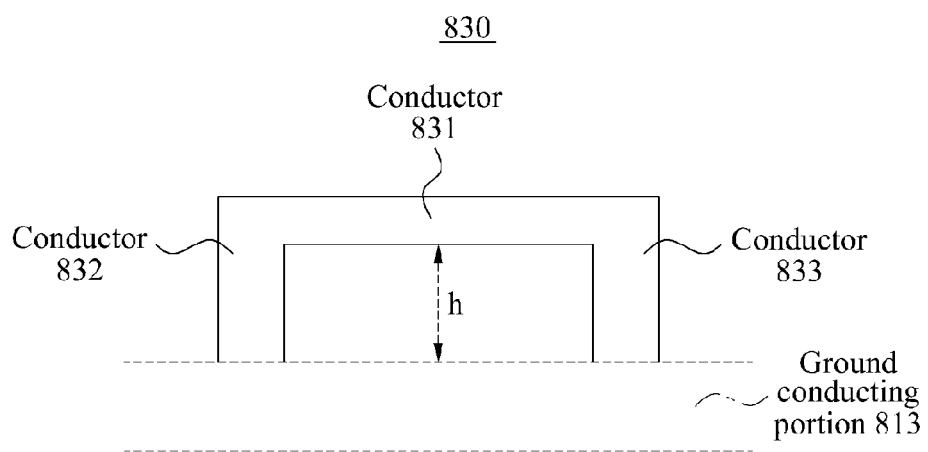
Figure 14B:
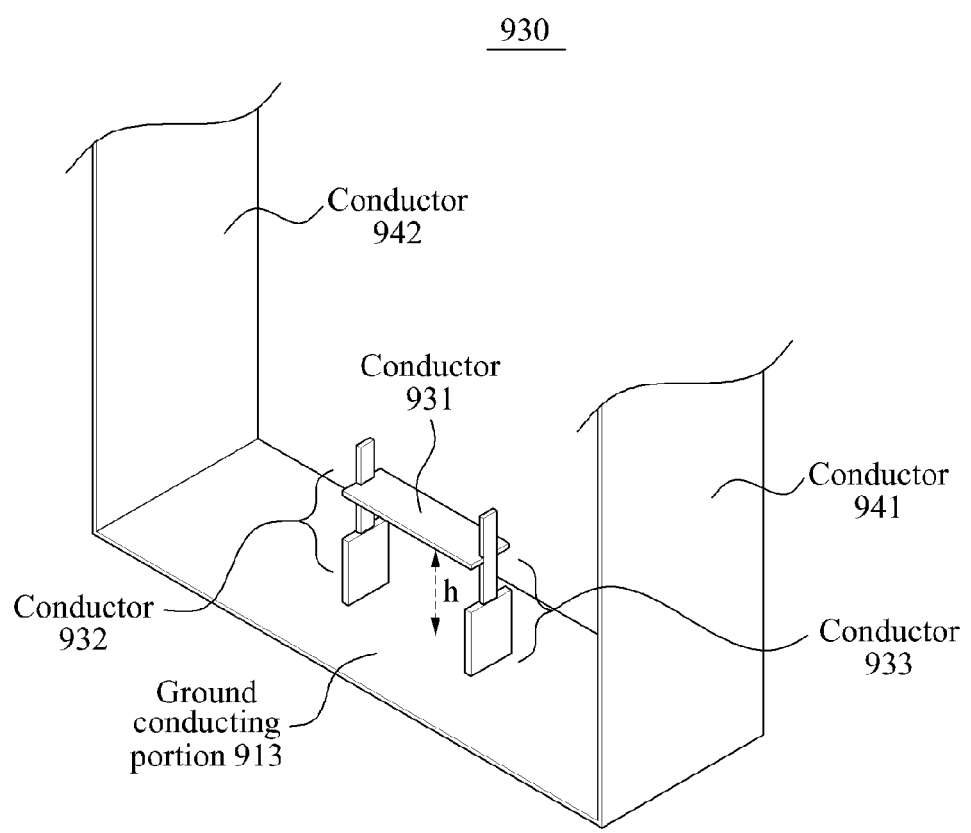

FIG. 14A illustrates an example of the matcher 830 used in the resonator 800 provided in FIG. 8, and FIG. 14B illustrates an example of the matcher 930 used in the resonator 900 provided in FIG. 9.

Specifically, FIG. 14A illustrates a portion of the resonator 800 including the matcher 830, and FIG. 14B illustrates a portion of the resonator 900 including the matcher 930.

Referring to FIG. 14A, the matcher 830 includes a conductor 831, a conductor 832, and a conductor 833. The conductors 832 and 833 are connected to the ground conducting portion 813 and the conductor 831. The impedance of the resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Referring to FIG. 14B, the matcher 930 includes a conductor 931, a conductor 932, and a conductor 933. The conductors 932 and 933 are connected to the ground conducting portion 913 and the conductor 931. The impedance of the resonator may be determined based on a distance h between the conductor 931 and the ground conducting portion 913. The distance h between the conductor 931 and the ground conducting portion 913 may be controlled by the controller. Similar to the matcher 830 included in the resonator 800, the distance h between the conductor 931 and the ground conducting portion 913 may be adjusted using a variety of schemes. For example, the variety of schemes may include a scheme of adjusting the distance h by adaptively activating one of the conductors 931, 932, and 933, a scheme of adjusting the physical location of the conductor 931 up and down, and the like.

Although not illustrated in FIGS. 14A and 14B, the matcher may include an active element. For example, the impedance of the resonator may be adjusted by changing a path of a current flowing through the matcher using the active element.

Figure 15:
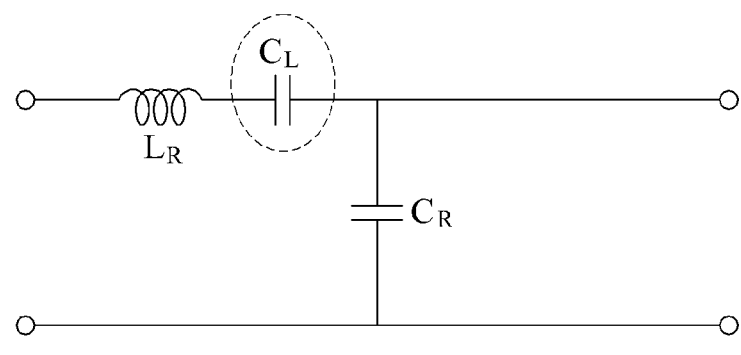
FIG. 15 is a diagram illustrating an example of an equivalent circuit of the resonator illustrated in FIG. 8.

FIG. 15 illustrates an example of an equivalent circuit of the resonator 800 for the wireless power transmission of FIG. 8.

The resonator 800 for the wireless power transmission may be modeled to the equivalent circuit of FIG. 15. In the equivalent circuit of FIG. 15, $C_L$ denotes a capacitor that is inserted in the form of a lumped element in the middle of the transmission line of FIG. 8.

For example, the resonator 800 may have a zeroth resonance characteristic. If a propagation constant is "0", the resonator 800 may be assumed to have $\omega_{MZR}$ as a resonance frequency. The resonance frequency $\omega_{MZR}$ may be expressed by Equation 4.

$$\omega_{MZR} = \frac{1}{\sqrt{L_R C_L}} \qquad \text{[Equation 4]}$$

In Equation 4, MZR denotes a Mu zero resonator.

Referring to Equation 4, the resonance frequency $\omega_{MZR}$ of the resonator 800 may be determined by $$\frac{L_R}{C_L}.$$

A physical size of the resonator 800 and the resonance frequency $\omega_{MZR}$ may be independent with respect to each other. Because the physical sizes are independent with respect to each other, the physical size of the resonator 800 may be sufficiently reduced.

In a wireless power transmission and charging system, interference in peripheral devices may be reduced, and a power transmission efficiency may be simultaneously increased using an in-band communication scheme.

In a wireless power transmission and charging system, a communication error may be reduced, and a power transmission efficiency may be increased, by performing an in-band communication using a shortened packet generated by converting a general packet of a byte scale to a packet of a bit scale.

Figure 16:
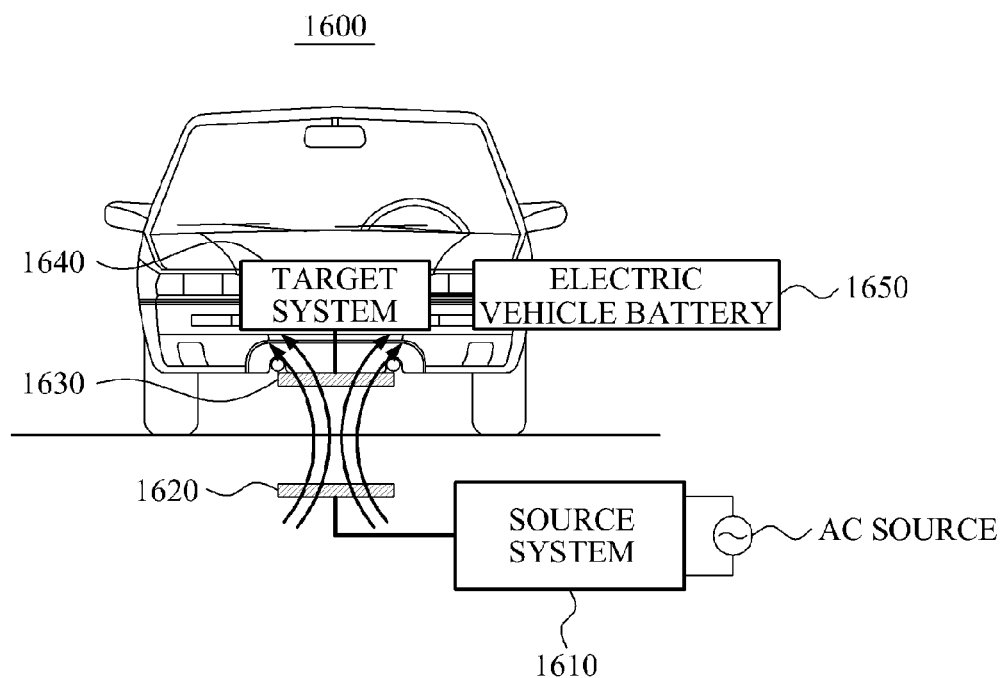
FIG. 16 is a diagram illustrating an electric vehicle charging system.

FIG. 16 illustrates an electric vehicle charging system.

Referring to FIG. 16, an electric vehicle charging system 1600 includes a source system 1610, a source resonator 1620, a target resonator 1630, a target system 1640, and an electric vehicle battery 1650.

The electric vehicle charging system 1600 may have a similar structure to the wireless power transmission system of FIG. 1. The source system 1610 and the source resonator 1620 in the electric vehicle charging system 1600 may function as a source. Additionally, the target resonator 1630 and the target system 1640 in the electric vehicle charging system 1600 may function as a target.

The source system 1610 may include a variable SMPS, a power amplifier, a matching network, a controller, and a communication unit, similarly to the source 110 of FIG. 1. The target system 1640 may include a matching network, a rectification unit, a DC/DC converter, a communication unit, and a controller, similarly to the target 120 of FIG. 1.

The electric vehicle battery 1650 may be charged by the target system 1640.

The electric vehicle charging system 1600 may use a resonant frequency in a band of a few kilohertz (KHz) to tens of MHz.

The source system 1610 may generate power, based on a type of charging vehicle, a capacity of a battery, and a charging state of a battery, and may supply the generated power to the target system 1640.

The source system 1610 may control the source resonator 1620 and the target resonator 1630 to be aligned. For example, when the source resonator 1620 and the target resonator 1630 are not aligned, the controller of the source system 1610 may transmit a message to the target system 1640, and may control alignment between the source resonator 1620 and the target resonator 1630.

For example, when the target resonator 1630 is not located in a position enabling maximum magnetic resonance, the source resonator 1620 and the target resonator 1630 may not be aligned. When a vehicle does not stop accurately, the source system 1610 may induce a position of the vehicle to be adjusted, and may control the source resonator 1620 and the target resonator 1630 to be aligned.

The source system 1610 and the target system 1640 may transmit or receive an ID of a vehicle, or may exchange various messages, through communication.

The descriptions of FIGS. 2 through 15 may be applied to the electric vehicle charging system 1600. However, the electric vehicle charging system 1600 may use a resonant frequency in a band of a few KHz to tens of MHz, and may transmit power that is equal to or higher than tens of watts to charge the electric vehicle battery 1650.

Thus, a variety of information may be exchanged between a source device and a target device using the suggested command messages and response messages.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a wireless power transmission and charging system, the communication method comprising:
    transmitting a first message to a target device for performing communication with the target device through an in-band communication using a resonance frequency or an out-band communication;
    receiving, from the target device, information concerned with the target device in response to the first message;
    transmitting, to the target device, a second message to control a power supply of the target device,
    wherein the second message comprises a command to control the target device to provide a power to a load, or suspend a power supply to the load;
    generating power to be used by the target device by converting a direct current (DC) voltage to an alternating current (AC) voltage using the resonance frequency; and
    transmitting the power to the target device through magnetic coupling.

2. The communication method of claim 1, wherein at least one of the first message and the information concerned with the target device corresponds to a shortened packet that is generated by converting a packet of a byte scale into a packet of a bit scale.

3. The communication method of claim 2, wherein the shortened packet comprises a field to indicate a start of a packet, a field to indicate an identifier of the target device, a field to indicate a command to be transferred to the target device, and a field to check an error of the shortened packet.

4. The communication method of claim 2, wherein the shortened packet comprises a field to be added in order to prevent packet loss in a wireless environment, a field to indicate a start of a packet, a field to indicate a command to be transferred to a source device, a field to indicate data associated with the command, and a field to check an error of the shortened packet.

5. The communication method of claim 1, wherein the information concerned with the target device comprises at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

6. The communication method of claim 1 further comprising:
    assigning, to the target device, a virtual identifier to be used during charging.

7. The communication method of claim 1, wherein the second message comprises at least one of:
    a reset command to request a reset of the target device, in response to an error occurring in an operation of the target device,
    a command to request an input voltage value and an input current value of a target device,
    a command to request a direct current to direct current (DC/DC) output voltage value and a DC/DC output current value of the target device,
    a command to request state information about the target device,
    a command to stop the power supply to the load,
    a command to transfer communication regulations,
    a command to request registration information about the target device,
    a command to control the target resonator to be powered ON and OFF, and
    a command to request a change of a message format.

8. A communication method of a wireless power transmission and charging system, the communication method comprising:
    transmitting, to a target device, a request message or an information message to direct a predetermined operation;
    receiving, from the target device, a response message corresponding to the request message or the information message;
    generating power to be used by the target device, by converting a direct current (DC) voltage to an alternating current (AC) voltage using the resonance frequency; and
    transmitting the power to the target device through magnetic coupling,
    wherein at least one of the request message or the information message comprises a field to indicate a command to be transferred to the target device,
    wherein the field to indicate the command comprises a command to control the target device to provide a power to a load or suspend a power supply to the load, and
    wherein the transmitting the request message or the information message comprises:
    transmitting, to a target device, the request message or the information message through an in-band communication using a resonance frequency or an out-band communication.

9. The communication method of claim 8, wherein at least one of the request message or the information message comprises a field to indicate a start of the request message or the information message, a field to indicate an identifier of the target device, and a check field to check an error of the request message or the information message, and each of the fields is of a bit scale.

10. The communication method of claim 9, wherein the field to indicate the command comprises at least one of:
    a reset command to request a reset of the target device, in response to an error occurring in an operation of the target device,
    a command to request an input voltage value and an input current value of a target device,
    a command to request a DC/DC output voltage value and a DC/DC output current value of the target device,
    a command to request state information about the target device,
    a command to stop the power supply to the load,
    a command to transfer communication regulations,
    a command to request registration information about the target device, a command to control the target resonator to be powered ON and OFF, and a command to request a change of a message format.

11. A communication method of a wireless power transmission and charging system, the communication method comprising:

receiving a first message from a source device for performing communication with the source device through an in-band communication using a resonance frequency or an out-band communication; and transmitting, to the source device, information concerned with a target device in response to the first message;

receiving, from the source device, a second message including a predetermined command;

performing an operation in accordance with the predetermined command; and transmitting, to the source device, a response message corresponding to the second message, wherein the second message comprises a command to control the target device to provide a power to a load, or suspend a power supply to the load.

12. The communication method of claim 11, wherein the transmitting information concerned with the target device comprises:

transmitting, to the source device, the information concerned with the target device, using a shortened packet generated by converting a packet of a byte scale to a packet of a bit scale.

13. The communication method of claim 11, further comprising receiving, through magnetic coupling with the source device, power that is to be used for communication.

14. The communication method of claim 11, wherein the information concerned with the target device comprises at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

15. The communication method of claim 11, wherein the response message comprises a field to be added in order to prevent packet loss in a wireless environment, a field to indicate a start of a packet, a field to indicate a command to be transferred to a source device, a field to indicate data associated with the command, and a field to check an error of a shortened packet generated by converting a packet of a byte scale to a packet of a bit scale.

16. The communication method of claim 15, wherein the field to indicate the command comprises at least one of:

a command to indicate a response message in response to a request for an input voltage value and an input current value of a target device, a command to indicate a response to a request for a DC-to-DC (DC/DC) output voltage value and a DC/DC output current value of the target device, a command to indicate a response to a request for state information about the target device, and a command to indicate a response to a request for registration information about the target device.

17. The communication method of claim 16 wherein the field to indicate the data associated with the command comprises at least one of an input voltage value and an input current value of a target device, a DC/DC output voltage value and a DC/DC output current value of the target device, state information about the target device, and registration information about the target device.

18. The communication method of claim 17, wherein the registration information about the target device comprises at least one of a product type, manufacturer information, a product model name, a battery type, a charging scheme, an impedance value of a load, information about a characteristic of a target resonator, information about a used frequency band, an amount of a power to be used, an intrinsic identifier, and product version information or standards information.

19. A wireless power transmitter comprising:

a transmitter configured to transmit a first message to a target device through an in-band communication using a resonance frequency for performing communication with the target device or an out-band communication;

a receiver configured to receive, from the target device, information concerned with the target device in response to the first message;

transmitting, to the target device, a second message to control a power supply of the target device, wherein the second message comprises a command to control the target device to provide a power to a load, or suspend a power supply to the load;

a power converter configured to generate power to be used by the target device by converting a direct current (DC) voltage to an alternating current (AC) voltage using the resonance frequency; and a source resonator configured to transmit the power to the target device through magnetic coupling, wherein at least one of the first message and the information concerned with the target device corresponds to a shortened packet generated by converting a packet of a byte scale to a packet of a bit scale.

20. The wireless power transmitter of claim 19, wherein the transmitter is further configured to transmit wireless power for charging and/or powering a device using the resonance frequency.

21. A wireless power transmitter comprising:

a processor comprising:

a transmitter configured to transmit, to the target device, a first message and transmit a second message to control a power supply of the target device;

a receiver configured to receive, from the target device, a first response message corresponding to the first message and a second response message corresponding to the second message, a power converter configured to generate power to be used by the target device, by converting a direct current (DC) voltage to an alternating current (AC) voltage using the resonance frequency; and a source resonator configured to transmit the power to the target device through magnetic coupling, wherein the second message comprises a field to indicate a command to be transferred to the target device, wherein the field to indicate the command comprises a command to control the target device to provide a power to a load or suspend a power supply to the load, and wherein the transmitter configured to transmit the second message comprises transmitting the second message through an in-band communication using a resonance frequency or an out-band communication.

22. The wireless power transmitter of claim 21, wherein the second message comprises a field to indicate a start of the request message or the information message, a field to indicate an identifier of the target device, and a check field to check an error of the request message or the information message, and each of the fields is of a bit scale.

23. A wireless power receiver comprising:
a processor comprising:
a controller configured to demodulate a first message and second message received from a source device, and to transmit, to the source device, a first response message corresponding to the first message received from the source device and a second response message corresponding to the second message received from the source device,
wherein the second message received from the source device is received through an in-band communication using a resonance frequency or an out-band communication, and
wherein the first response message and second response message comprises a shortened packet generated by converting a packet of a byte scale to a packet of a bit scale.

24. The wireless power transmitter of claim 21, wherein the transmitter is further configured to transmit wireless power for charging and/or powering a device using the resonance frequency.

25. A wireless power transmitter comprising:
a transmitter configured to transmit data on a channel through an in-band communication using a resonance frequency or an out-band communication;
a power converter configured to generate power to be used by a target device, by converting a direct current (DC) voltage to an alternating current (AC) voltage using the resonance frequency; and
a source resonator configured to transmit the power to the target device through magnetic coupling,
wherein the channel is utilized to transmit and receive wireless power for charging and/or powering a receiving device,
wherein the channel is utilized to transmit a second message comprising a field to indicate a command to be transferred to the target device,
wherein the field to indicate the command comprises a command to control the target device to provide a power to a load, or suspend a power supply to the load; and
a power supply configured to supply the power that is to be transmitted as the wireless power for charging and/or powering the device, wherein the data transmitted by the transmitter comprises a shortened packet that is generated by converting a packet of a byte scale into a packet of a bit scale.

* * * * *